United States Patent
Wang et al.

(10) Patent No.: US 12,414,077 B2
(45) Date of Patent: Sep. 9, 2025

(54) PAGING MESSAGE DETECTION METHOD, APPARATUS, AND COMMUNICATION DEVICE

(71) Applicant: HUAWEI TECHNOLOGIES CO., LTD., Guangdong (CN)

(72) Inventors: Yan Wang, Beijing (CN); Baokun Shan, Shenzhen (CN); Bingzhao Li, Beijing (CN); Haifeng Yu, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 17/707,050

(22) Filed: Mar. 29, 2022

(65) Prior Publication Data

US 2022/0225274 A1   Jul. 14, 2022

Related U.S. Application Data

(63) Continuation of application No. PCT/CN2019/109699, filed on Sep. 30, 2019.

(51) Int. Cl.
*H04W 68/02* (2009.01)
*H04W 52/02* (2009.01)

(52) U.S. Cl.
CPC ....... *H04W 68/02* (2013.01); *H04W 52/0235* (2013.01)

(58) Field of Classification Search
CPC ............................. H04W 68/02; H04W 52/0235
See application file for complete search history.

(56) References Cited

U.S. PATENT DOCUMENTS

2018/0270895 A1   9/2018   Park et al.
2019/0254110 A1*  8/2019   He ...................... H04L 41/0896
(Continued)

FOREIGN PATENT DOCUMENTS

CN    110198557 A    9/2019
WO    2018144873 A1   8/2018
(Continued)

OTHER PUBLICATIONS

Huawei, HiSilicon, Group based wake-up signal. 3GPP TSG-RAN WG2 Meeting #104, Spokane, USA, Nov. 12, 16, 2018, R2-1816400, 3 pages.
(Continued)

*Primary Examiner* — Curtis B Odom
(74) *Attorney, Agent, or Firm* — WOMBLE BOND DICKINSON (US) LLP

(57) ABSTRACT

This application provides a paging message detection method and apparatus, and a communication device. A first access device determines a first resource when the first access device is to send a radio access network paging message to a first terminal device in an inactive state, where the first resource is to carry a first wake-up signal; and the first wake-up signal is to indicate the first terminal device to detect downlink control information for scheduling the paging message that is carried by a first paging occasion resource. The first access device sends the first wake-up signal to the first terminal device on the first resource. The first access device sends, on the first paging occasion resource, the downlink control information for scheduling the paging message. In this way, power consumption of the terminal device can be reduced, and electric energy can be saved.

15 Claims, 5 Drawing Sheets

(56) References Cited

U.S. PATENT DOCUMENTS

2020/0245246 A1* 7/2020 Dhanda ................ H04W 76/27
2022/0086759 A1* 3/2022 Höglund ............. H04W 68/005

FOREIGN PATENT DOCUMENTS

| WO | 2018201482 A1 | 11/2018 |
|---|---|---|
| WO | 2018202797 A1 | 11/2018 |
| WO | 2018204799 A1 | 11/2018 |

OTHER PUBLICATIONS

3GPP TS 36.300 V15.7.0 (Sep. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15), 365 pages.
Nokia et al, "Response to R3-174734", 3GPP TSG-RAN WG3 Meeting #98, R3-174867, Dec. 1, 2017, total 4 pages.
Huawei et al., "Assistance indication for WUS grouping", 3GPP TSG-SA2 Meeting # 134, S2-1907723, Jun. 28, 2019, total 14 pages.
3GPP TS 38.304 V15.5.0, 3rd Generation Partnership Project;Technical Specification Group Radio Access Network; NR;User Equipment (UE) procedures in Idle mode and RRC Inactive state, Sep. 2019, 29 pages.
3GPP TS 38.331 V15.7.0 (Sep. 2019), 3rd Generation Partnership Project; Technical Specification Group Radio Access Network; NR; Radio Resource Control (RRC) protocol specification(Release 15), 527 pages.
3GPP TS 38.300 V15.7.0 (Sep. 2019), 3rd Generation Partnership Project; Technical Specification Group Radio Access Network; NR; NR and NG-RAN Overall Description; Stage 2(Release 15), 99 pages.
3GPP TS 38.213 V15.7.0 (Sep. 2019), 3rd Generation Partnership Project; Technical Specification Group Radio Access Network; NR; Physical layer procedures for control(Release 15), 108 pages.
3GPP TS 23.502 V16.2.0: 3rd Generation Partnership Project; Technical Specification Group Services and System Aspects; Procedures for the 5G System (5GS); Stage 2 (Release 16) Sep. 2019 total 525 pages.
3GPP TS 23.501 V16.2.0, 3rd Generation Partnership Project;Technical Specification Group Services and System Aspects;System Architecture for the 5G System (5GS);Stage 2, Sep. 2019, 391 pages.
3GPP TS 38.212 V15.7.0 (Sep. 2019), 3rd Generation Partnership Project; Technical Specification Group Radio Access Network; NR; Multiplexing and channel coding(Release 15), 101 pages.
3GPP TS 38.423 V15.4.0 (Jul. 2019), 3rd Generation Partnership Project; Technical Specification Group Radio Access Network; NG-RAN; Xn application protocol (XnAP)(Release 15), 309 pages.
3GPP TS 38.413 V15.4.0 (Jul. 2019), 3rd Generation Partnership Project; Technical Specification Group Radio Access Network; NG-RAN; NG Application Protocol (NGAP)(Release 15), 328 pages.
3GPP TS 36.304 V15.4.0 (Jun. 2019), 3rd Generation Partnership Project; Technical Specification Group Radio Access Network; Evolved Universal Terrestrial Radio Access (E-UTRA); User Equipment (UE) procedures in idle mode (Release 15), 55 pages.

* cited by examiner

PAGING MESSAGE DETECTION METHOD, APPARATUS, AND COMMUNICATION DEVICE

CROSS-REFERENCE TO RELATED APPLICATIONS

This application is a continuation of International Application No. PCT/CN2019/109699, filed on Sep. 30, 2019, the disclosure of which is hereby incorporated by reference in its entirety.

TECHNICAL FIELD

Embodiments of this application relate to the communication field, and in particular, to a paging message detection method, an apparatus, and a communication device.

BACKGROUND

An inactive state of user equipment (UE) is introduced into a fifth generation mobile communication system, and a radio access network (RAN) device (for example, a base station) can configure the user equipment to the inactive state. A behavior of the UE in the inactive state is similar to that in an idle state, but differs from that in the idle state in as follows: in the inactive state, a last serving base station and the UE store contexts of the UE, and an NG connection related to the UE is still reserved between the last serving base station and a core network device. In other words, the core network device considers that the UE is still in a connected state unless a last serving RAN device reports that the UE is in the inactive state to the core network device.

Before the UE enters the inactive state, the base station configures a RAN notification area (RNA) for the UE. The UE moves within the RNA (that is, cell reselection) without notifying the RAN device. When data of the UE arrives at the core network device, the core network device does not page the UE but directly sends the data to the last serving base station, and the last serving base station sends, in a cell within the RNA, a RAN paging message to page the UE. The RNA may include a cell of the last serving base station and a cell of a nearby base station. When the RNA includes the cell of the nearby base station, a RAN paging message is sent to the nearby base station through an Xn interface, to trigger paging in the cell of the nearby base station.

When the UE is in the inactive state, the UE blindly detects, on each paging occasion (PO), downlink control information used to schedule a paging message. In this case, power consumption is high for UE with a low probability of being paged. Therefore, how to reduce power consumption of detecting a paging message by the UE in the inactive state and save electric energy becomes an urgent problem to be resolved.

SUMMARY

This application provides a paging message detection method, an apparatus, and a communication device, to reduce power consumption of detecting a paging message by a terminal device in an inactive state, and help the terminal device save power.

According to a first aspect, a paging message detection method is provided. The method may be performed by an access device, or may be performed by a chip or a circuit configured in the access device. This is not limited in this application.

The method includes: a first access device determines a first resource, where the first resource is used to carry a first wake-up signal, the first wake-up signal is used to indicate a first terminal device to detect downlink control information used to schedule a paging message, and the downlink control information is carried on a first paging occasion resource; the first access device sends the first wake-up signal to the first terminal device on the first resource; and the first access device sends, on the first paging occasion resource, the downlink control information used to schedule the paging message.

Further, in some embodiments, a first access device determines a first resource includes:

the first access device determines the first resource when the first access device is to send the paging message to the first terminal device in an inactive state.

According to the method in this application, when an access device sends a paging message to a terminal device in an inactive state, before sending a paging occasion resource, the access device sends a wake-up signal to indicate the terminal device to detect, on the paging occasion resource, downlink control information used to schedule a paging message, and does not send the wake-up signal to the terminal device when the paging message is not sent to the terminal device in the inactive state. When detecting no wake-up signal, the terminal device does not detect, on the paging occasion message, the downlink control information used to schedule the paging message, and determines, based on an indication of the wake-up signal, whether to blindly detect the downlink control information on the paging occasion resource. This can reduce power consumption of detecting the paging message by the terminal device in the inactive state, and save electric energy.

With reference to the first aspect, in some embodiments, the first wake-up signal is a wake-up signal determined by the first access device based on a value of a first parameter of the first terminal device and according to a first mapping rule. The first mapping rule is used to indicate that each of n value ranges of the first parameter corresponds to one wake-up signal, and the first wake-up signal is a wake-up signal corresponding to a value range to which the value of the first parameter of the first terminal device belongs, where n is an integer greater than or equal to 0.

According to the solution of this application, the access device determines, based on a value of a first parameter of the terminal device, the wake-up signal used to indicate the terminal device to detect the downlink control information used to schedule the paging message, so as to group terminal devices based on frequencies at which the terminal devices are paged. This further reduces power consumption of a terminal device paged rarely, and saves electric energy.

With reference to the first aspect, in some embodiments, the method further includes:

The first access device receives first indication information sent by a core network device, where the first indication information is used to indicate the value of the first parameter of the first terminal device.

With reference to the first aspect, in some embodiments, the method further includes:

The first access device receives second indication information sent by a core network device, where the second indication information is used to indicate a first terminal device group to which the first terminal device belongs; and the first access device determines the first terminal device group based on the second indication information, where the first terminal device group is one terminal device group in one or more terminal device groups, each of the one or more terminal device groups corresponds to one wake-up signal, and the first wake-up signal is a wake-up signal corresponding to the first terminal device group.

With reference to the first aspect, in some embodiments, the method further includes:

The first access device receives third indication information sent by a core network device, where the third indication information is used to indicate the first wake-up signal or an index value of the first wake-up signal, so that the first access device determines that a wake-up signal used to indicate the first terminal device to detect the downlink control information that is used to schedule the paging message is the first wake-up signal.

With reference to the first aspect, in some embodiments, the method further includes:

The first access device sends fourth indication information to the core network device, where the fourth indication information is used to indicate historical information of the first terminal device during the inactive state, so that the core network device updates, based on the fourth indication information, indication information to be sent to the first access device.

A RAN #1 reports historical information of a terminal device #1 during the inactive state is reported to a core network device, so that the core network can update indication information A based on the historical information reported by the RAN #1, and can more accurately allocate a to-be-detected wake-up signal to the terminal device. This effectively reduces power consumption of the terminal device and saves electric energy.

With reference to the first aspect, in some embodiments, the method further includes:

The first access device receives fifth indication information sent by the core network device, where the fifth indication information is used to indicate that the first terminal device supports detecting the first wake-up signal.

That the first access device sends the first wake-up signal to the first terminal device on the first resource includes:

The first access device sends the first wake-up signal to the first terminal device on the first resource after determining, based on the fifth indication information, that the first terminal device supports detecting the first wake-up signal.

With reference to the first aspect, in some embodiments, the method further includes:

The first access device sends sixth indication information to the first terminal device, where the sixth indication information is used to indicate the value of the first parameter of the first terminal device, so that the first terminal device determines the first wake-up signal based on the sixth indication information.

With reference to the first aspect, in some embodiments, the method further includes:

The first access device sends seventh indication information to a second access device, where the second access device is an access device in a radio access network notification area RNA of the first terminal device, and the seventh indication information includes at least one type of the following information: the value of the first parameter of the first terminal device, the first wake-up signal, the index value of the first wake-up signal, grouping information of terminal devices, and information about the wake-up signal corresponding to each terminal device group.

With reference to the first aspect, in some embodiments, that the first access device sends the first wake-up signal to the first terminal device on the first resource includes:

The first access device sends the first wake-up signal to the first terminal device on the first resource after determining that the value of the first parameter of the first terminal device is less than a preset threshold.

With reference to the first aspect, in some embodiments, the first parameter includes one or more of a probability that the terminal device is paged, a frequency at which the terminal device is paged, or a movement status of the terminal device.

According to a second aspect, a paging message detection method is provided. The method may be performed by an access device, or may be performed by a chip or a circuit configured in the access device. This is not limited in this application.

The method includes: a second access device receives seventh indication information sent by a first access device, where the seventh indication information is used by the second access device to determine a first wake-up signal, and the first wake-up signal is used to indicate a first terminal device in an inactive state to detect downlink control information that is carried in a first paging occasion resource and used to schedule a paging message; the second access device sends the first wake-up signal to the first terminal device on a first resource; and the second access device sends, on the first paging occasion resource, the downlink control information used to schedule the paging message.

The second access device is an access device in a radio access network notification area RNA of the first terminal device.

According to the method in this application, when the second access device in the RNA of the first terminal device sends the paging message to a terminal device in the inactive state by using an indication of a first access network, before sending a paging occasion resource, the second access device sends a wake-up signal to indicate the terminal device to detect, on the paging occasion resource, the downlink control information used to schedule the paging message, and does not send the wake-up signal to the terminal device when the paging message is not sent to the terminal device in the inactive state. When detecting no wake-up signal, the terminal device does not detect, on the paging occasion message, the downlink control information used to schedule the paging message, and determines, based on an indication of the wake-up signal, whether to blindly detect the downlink control information on the paging occasion resource. This can reduce power consumption of detecting the paging message by the terminal device in the inactive state, and save electric energy.

With reference to the second aspect, in some embodiments, the seventh indication information is carried in an Xn Application Protocol (XnAP) radio access network (RAN) paging message sent by the first access device to the second access device.

With reference to the second aspect, in some embodiments, the seventh indication information is used to indicate a value of a first parameter of the first terminal device.

That the seventh indication information is used by the second access device to determine a first wake-up signal includes:

The second access device determines the first wake-up signal based on the value of the first parameter of the first terminal device and according to a first mapping rule, where the first mapping rule is used to indicate that each of n value ranges of the first parameter corresponds to one wake-up signal. The first wake-up signal is a wake-up signal corresponding to a value range to which the value of the first parameter of the first terminal device belongs, where n is an integer greater than or equal to 0.

With reference to the second aspect, in some embodiments, the seventh indication information is used to indicate a first terminal device group to which the first terminal device belongs. The first terminal device group is one terminal device group in one or more terminal device groups, each of the one or more terminal device groups corresponds to one wake-up signal, and the first wake-up signal is a wake-up signal corresponding to the first terminal device group.

With reference to the second aspect, in some embodiments, the seventh indication information is used to indicate the first wake-up signal or an index value of the first wake-up signal.

With reference to the second aspect, in some embodiments, the seventh indication information is used to indicate that the first terminal device supports detecting the first wake-up signal.

That the second access device sends the first wake-up signal to the first terminal device on a first resource includes:

The second access device sends the first wake-up signal to the first terminal device after determining, based on the seventh indication information, that the first terminal device supports detecting the first wake-up signal.

According to a third aspect, a paging message detection method is provided. The method may be performed by a terminal device, or may be performed by a chip or a circuit configured in the terminal device. This is not limited in this application.

The method includes: a first terminal device detects, on a first resource, a first wake-up signal sent by a first access device, where the first wake-up signal is used to indicate the first terminal device to detect, on a first paging occasion resource, downlink control information that is sent by the first access device and used to schedule a paging message; and when the first terminal device detects the first wake-up signal on the first resource, the first terminal device detects, on the first paging occasion resource, the downlink control information that is sent by the first access device and used to schedule the paging message.

According to the method in this application, the terminal device detects a wake-up signal before detecting a paging occasion resource, when detecting the wake-up signal, blindly detects, on the paging occasion resource, the downlink control information used to schedule the paging message, and determines, based on an indication of the wake-up signal, whether to blindly detect the downlink control information on the paging occasion resource. This can reduce power consumption of detecting the paging message by the terminal device in an inactive state, and save electric energy.

With reference to the third aspect, in some embodiments, the first wake-up signal is a wake-up signal determined by the first terminal device based on a value of a first parameter of the first terminal device and according to a first mapping rule. The first mapping rule is used to indicate that each of n value ranges of the first parameter corresponds to one wake-up signal, and the first wake-up signal is a wake-up signal corresponding to a value range to which the value of the first parameter of the first terminal device belongs, where n is an integer greater than or equal to 0.

With reference to the third aspect, in some embodiments, the method further includes:

The first terminal device receives sixth indication information sent by the first access device, where the sixth indication information is used to indicate the value of the first parameter of the terminal device.

With reference to the third aspect, in some embodiments, the method further includes:

The first terminal device receives eighth indication information sent by a core network device, where the eighth indication information is used to indicate the value of the first parameter of the terminal device.

With reference to the third aspect, in some embodiments, the first parameter includes one or more of a probability that the terminal device is paged, a frequency at which the terminal device is paged, or a movement status of the terminal device.

With reference to the third aspect, in some embodiments, the method further includes:

The first terminal device receives ninth indication information sent by the first access device, where the ninth indication information is used to indicate the first wake-up signal or an index value of the first wake-up signal.

With reference to the third aspect, in some embodiments, the method further includes:

The first terminal device receives tenth indication information sent by a core network device, where the tenth indication information is used to indicate the first wake-up signal or an index value of the first wake-up signal.

With reference to the third aspect, in some embodiments, that a first terminal device detects, on a first resource, a first wake-up signal sent by a first access device includes:

The first terminal device determines that the value of the first parameter of the first terminal device is less than a preset threshold; and the first terminal device sends the first wake-up signal to the first terminal device on the first resource.

According to a fourth aspect, a paging message detection method is provided. The method may be performed by a core network device, or may be performed by a chip or a circuit configured in the core network device. This is not limited in this application.

The method includes: the core network device sends wake-up signal information to a first access network device, where the wake-up signal information is used by the first access device to determine a first wake-up signal to be sent to a first terminal device, and the first wake-up signal is used to indicate the first terminal device to detect downlink control information that is carried in a first paging occasion resource and used to schedule a paging message.

According to the method in this application, when indicating an access device to send a paging message, the core network device determines the wake-up signal that is used by the terminal device to detect the downlink control information used to schedule the paging message, so that the access device and the terminal device reach a consensus, and the terminal device determines, based on an indication of the wake-up signal, whether to blindly detect the downlink control information on a paging occasion resource. In this case, power consumption of detecting the paging message by the terminal device in the inactive state can be reduced, and electric energy can be saved.

With reference to the fourth aspect, in some embodiments, the wake-up signal information is used to indicate a value of a first parameter of the first terminal device, so that the first access device determines the first wake-up signal based on the value of the first parameter of the first terminal device.

With reference to the fourth aspect, in some embodiments, the wake-up signal information is used to indicate a first terminal device group to which the first terminal device belongs. The first terminal device group is one terminal device group in one or more terminal device groups, each of the one or more terminal device groups corresponds to one wake-up signal, and the first wake-up signal is a wake-up signal corresponding to the first terminal device group.

With reference to the fourth aspect, in some embodiments, the wake-up signal information is used to indicate the first wake-up signal or an index value of the first wake-up signal.

With reference to the fourth aspect, in some embodiments, the method further includes:

The core network device receives fourth indication information sent by the first access device, where the fourth indication information is used to indicate historical information of the first terminal device during the inactive state; and the core network device updates the wake-up signal information based on the historical information.

With reference to the fourth aspect, in some embodiments, the wake-up signal information and/or the fourth indication information is transferred by using an NG interface resource that is of a terminal device and that is between the core network device and the first access device.

According to a fifth aspect, a communication apparatus is provided, where the apparatus may be configured in or is a first access device, and includes: a processing unit, configured to determine a first resource when the communication apparatus is to send a paging message to a first terminal device in an inactive state, where the first resource is used to carry a first wake-up signal, and the first wake-up signal is used to indicate the first terminal device to detect downlink control information that is carried in a first paging occasion resource and used to schedule the paging message; and a transceiver unit, configured to send the first wake-up signal to the first terminal device on the first resource, and further configured to send, on the first paging occasion resource, the downlink control information used to schedule the paging message.

With reference to the fifth aspect, in some embodiments, the first wake-up signal is a wake-up signal determined by the first access device based on a value of a first parameter of the first terminal device and according to a first mapping rule. The first mapping rule is used to indicate that each of n value ranges of the first parameter corresponds to one wake-up signal, and the first wake-up signal is a wake-up signal corresponding to a value range to which the value of the first parameter of the first terminal device belongs, where n is an integer greater than or equal to 0.

With reference to the fifth aspect, in some embodiments, the transceiver unit is further configured to receive first indication information sent by a core network device, where the first indication information is used to indicate the value of the first parameter of the first terminal device.

With reference to the fifth aspect, in some embodiments, the transceiver unit is further configured to receive second indication information sent by a core network device, where the second indication information is used to indicate a first terminal device group to which the first terminal device belongs.

The processing unit is further configured to determine the first terminal device group based on the second indication information, where the first terminal device group is one terminal device group in one or more terminal device groups, each of the one or more terminal device groups corresponds to one wake-up signal, and the first wake-up signal is a wake-up signal corresponding to the first terminal device group.

With reference to the fifth aspect, in some embodiments, the transceiver unit is further configured to receive third indication information sent by a core network device, where the third indication information is used to indicate the first wake-up signal or an index value of the first wake-up signal, so that the first access device determines that a wake-up signal used to indicate the first terminal device to detect the downlink control information that is used to schedule the paging message is the first wake-up signal.

With reference to the fifth aspect, in some embodiments, the transceiver unit is further configured to send fourth indication information to the core network device, where the fourth indication information is used to indicate historical information of the first terminal device during the inactive state, so that the core network device updates, based on the fourth indication information, indication information to be sent to the first access device.

With reference to the fifth aspect, in some embodiments, the transceiver unit is further configured to receive fifth indication information sent by the core network device, where the fifth indication information is used to indicate that the first terminal device supports detecting the first wake-up signal.

That the first access device sends the first wake-up signal to the first terminal device on the first resource includes:

The first access device sends the first wake-up signal to the first terminal device on the first resource after determining, based on the fifth indication information, that the first terminal device supports detecting the first wake-up signal.

With reference to the fifth aspect, in some embodiments, the transceiver unit is further configured to send sixth indication information to the first terminal device, where the sixth indication information is used to indicate the value of the first parameter of the first terminal device, so that the first terminal device determines the first wake-up signal based on the sixth indication information.

With reference to the fifth aspect, in some embodiments, the transceiver unit is further configured to send seventh indication information to a second access device, where the second access device is an access device in a radio access network notification area RNA of the first terminal device, and the seventh indication information includes at least one type of the following information: the value of the first parameter of the first terminal device, the first wake-up signal, the index value of the first wake-up signal, grouping information of terminal devices, and information about the wake-up signal corresponding to each terminal device group.

With reference to the fifth aspect, in some embodiments, that the transceiver unit sends the first wake-up signal to the first terminal device on the first resource includes:

After the processing unit determines that the value of the first parameter of the first terminal device is less than a preset threshold, the transceiver unit sends the first wake-up signal to the first terminal device.

With reference to the fifth aspect, in some embodiments, the first parameter includes one or more of a probability that the terminal device is paged, a frequency at which the terminal device is paged, or a movement status of the terminal device.

In some embodiments, the communication apparatus further includes a memory. In some embodiments, the communication apparatus further includes a communication interface, and a processor is coupled to the communication interface.

In an embodiment, the communication apparatus is the first access device. When the communication apparatus is the first access device, the communication interface may be a transceiver or an input/output interface.

In another embodiment, the communication apparatus is a chip disposed in the first access device. When the communication apparatus is the chip disposed in the first access device, the communication interface may be an input/output interface.

In some embodiments, the transceiver may be a transceiver circuit. In some embodiments, the input/output interface may be an input/output circuit.

According to a sixth aspect, a communication apparatus is provided, where the apparatus may be configured in or is a second access device, and includes: a transceiver unit, configured to receive seventh indication information sent by a first access device; and a processing unit, configured to determine a first wake-up signal based on the seventh indication information, where the first wake-up signal is used to indicate a first terminal device in an inactive state to detect downlink control information that is carried by a first paging occasion resource and used to schedule a paging message, and the transceiver unit is further configured to send the first wake-up signal to the first terminal device on a first resource, and send, on the first paging occasion resource, the downlink control information used to schedule the paging message.

The second access device is an access device in a radio access network notification area (RNA) of the first terminal device.

With reference to the sixth aspect, in some embodiments, the seventh indication information is carried in an Xn Application Protocol (XnAP) radio access network (RAN) paging message sent by the first access device to the second access device.

With reference to the sixth aspect, in some embodiments, the seventh indication information is used to indicate a value of a first parameter of the first terminal device.

That the processing unit determines a first wake-up signal based on the seventh indication information includes:

The processing unit determines the first wake-up signal based on the value of the first parameter of the first terminal device and according to a first mapping rule, where the first mapping rule is used to indicate that each of n value ranges of the first parameter corresponds to one wake-up signal. The first wake-up signal is a wake-up signal corresponding to a value range to which the value of the first parameter of the first terminal device belongs, where n is an integer greater than or equal to 0.

With reference to the sixth aspect, in some embodiments, the seventh indication information is used to indicate a first terminal device group to which the first terminal device belongs. The first terminal device group is one terminal device group in one or more terminal device groups, each of the one or more terminal device groups corresponds to one wake-up signal, and the first wake-up signal is a wake-up signal corresponding to the first terminal device group.

With reference to the sixth aspect, in some embodiments, the seventh indication information is used to indicate the first wake-up signal or an index value of the first wake-up signal.

With reference to the sixth aspect, in some embodiments, the seventh indication information is used to indicate that the first terminal device supports detecting the first wake-up signal.

That the transceiver unit sends the first wake-up signal to the first terminal device on a first resource includes:

The processing unit sends the first wake-up signal to the first terminal device after determining, based on the seventh indication information, that the first terminal device supports detecting the first wake-up signal.

In some embodiments, the communication apparatus further includes a memory. In some embodiments, the communication apparatus further includes a communication interface, and a processor is coupled to the communication interface.

In an embodiment, the communication apparatus is the second access device. When the communication apparatus is the second access device, the communication interface may be a transceiver or an input/output interface.

In another embodiment, the communication apparatus is a chip disposed in the second access device. When the communication apparatus is the chip disposed in the second access device, the communication interface may be an input/output interface.

In some embodiments, the transceiver may be a transceiver circuit. In some embodiments, the input/output interface may be an input/output circuit.

According to a seventh aspect, a communication apparatus is provided, where the apparatus may be configured in or is a first terminal device, and includes: a processing unit, configured to detect, on a first resource, a first wake-up signal sent by a first access device, where the first wake-up signal is used to indicate the first terminal device to detect, on a first paging occasion resource, downlink control information that is sent by the first access device and used to schedule a paging message; and a transceiver unit, configured to: when the processing unit detects the first wake-up signal on the first resource, detect, on the first paging occasion resource, the downlink control information that is sent by the first access device and used to schedule the paging message.

With reference to the seventh aspect, in some embodiments, the first wake-up signal is a wake-up signal determined by the processing unit based on a value of a first parameter of the first terminal device and according to a first mapping rule. The first mapping rule is used to indicate that each of n value ranges of the first parameter corresponds to one wake-up signal, and the first wake-up signal is a wake-up signal corresponding to a value range to which the value of the first parameter of the first terminal device belongs, where n is an integer greater than or equal to 0.

With reference to the seventh aspect, in some embodiments, the transceiver unit is further configured to receive sixth indication information sent by the first access device, where the sixth indication information is used to indicate the value of the first parameter of the terminal device.

With reference to the seventh aspect, in some embodiments, the transceiver unit is further configured to receive eighth indication information sent by a core network device, where the eighth indication information is used to indicate the value of the first parameter of the terminal device.

With reference to the seventh aspect, in some embodiments, the first parameter includes one or more of a probability that the terminal device is paged, a frequency at which the terminal device is paged, or a movement status of the terminal device.

With reference to the seventh aspect, in some embodiments, the transceiver unit is further configured to receive ninth indication information sent by the first access device, where the ninth indication information is used to indicate the first wake-up signal or an index value of the first wake-up signal.

With reference to the seventh aspect, in some embodiments, the transceiver unit is further configured to receive tenth indication information sent by a core network device, where the tenth indication information is used to indicate the first wake-up signal or an index value of the first wake-up signal.

With reference to the seventh aspect, in some embodiments, that the transceiver unit detects, on a first resource, a first wake-up signal sent by a first access device includes:

After the processing unit determines that the value of the first parameter of the first terminal device is less than a preset threshold, the transceiver unit sends the first wake-up signal to the first terminal device on the first resource.

In some embodiments, the communication apparatus further includes a memory. In some embodiments, the communication apparatus further includes a communication interface, and a processor is coupled to the communication interface.

In an embodiment, the communication apparatus is a terminal device. When the communication apparatus is the terminal device, the communication interface may be a transceiver or an input/output interface.

In another embodiments, the communication apparatus is a chip disposed in the terminal device. When the communication apparatus is the chip configured in the terminal device, the communication interface may be an input/output interface.

In some embodiment, the transceiver may be a transceiver circuit. In some embodiments, the input/output interface may be an input/output circuit.

According to an eighth aspect, a communication apparatus is provided, where the apparatus may be configured in or is a core network device, and includes: a transceiver unit, configured to send wake-up signal information to a first access network device, where the wake-up signal information is used by the first access device to determine a first wake-up signal to be sent to a first terminal device, and the first wake-up signal is used to indicate the first terminal device to detect downlink control information that is carried in a first paging occasion resource and used to schedule a paging message.

With reference to the eighth aspect, in some embodiments, the wake-up signal information is used to indicate a value of a first parameter of the first terminal device, so that the first access device determines the first wake-up signal based on the value of the first parameter of the first terminal device.

With reference to the eighth aspect, in some embodiments, the wake-up signal information is used to indicate a first terminal device group to which the first terminal device belongs. The first terminal device group is one terminal device group in one or more terminal device groups, each of the one or more terminal device groups corresponds to one wake-up signal, and the first wake-up signal is a wake-up signal corresponding to the first terminal device group.

With reference to the eighth aspect, in some embodiments, the wake-up signal information is used to indicate the first wake-up signal or an index value of the first wake-up signal.

With reference to the eighth aspect, in some embodiments, the transceiver unit is further configured to receive fourth indication information sent by the first access device, where the fourth indication information is used to indicate historical information of the first terminal device during the inactive state, and the processing unit updates the wake-up signal information based on the historical information.

With reference to the eighth aspect, in some embodiments, the wake-up signal information and/or the fourth indication information is transferred by using an NG interface resource that is of a terminal device and that is between the core network device and the first access device.

In some embodiments, the communication apparatus further includes a memory. In some embodiments, the communication apparatus further includes a communication interface, and a processor is coupled to the communication interface.

In an embodiment, the communication apparatus is a core network device. When the communication apparatus is the core network device, the communication interface may be a transceiver or an input/output interface.

In another embodiment, the communication apparatus is a chip disposed in a core network device. When the communication apparatus is the chip disposed in the core network device, the communication interface may be an input/output interface.

In some embodiments, the transceiver may be a transceiver circuit. In some embodiments, the input/output interface may be an input/output circuit.

According to a ninth aspect, a processor is provided, including an input circuit, an output circuit, and a processing circuit. The processing circuit is configured to: receive a signal through the input circuit, and transmit a signal through the output circuit, to enable the processor to perform the method according to any one of the first aspect to the fourth aspect and the possible embodiments of the first aspect to the fourth aspect.

In an embodiment, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific embodiments of the processor and the circuits are not limited in embodiments of this application.

According to a tenth aspect, a processing apparatus is provided. The processing apparatus includes a processor and a memory. The processor is configured to: read instructions stored in the memory, receive a signal through a receiver, and transmit a signal through a transmitter, to perform the method according to any one of the first aspect to the fourth aspect and the possible embodiments of the first aspect to the fourth aspect.

In some embodiments, there are one or more processors, and there are one or more memories.

In some embodiments, the memory may be integrated with the processor, or the memory and the processor are separately disposed.

In an embodiment, the memory may be a non-transitory memory, for example, a read-only memory (ROM). The memory and the processor may be integrated into a same chip, or may be separately disposed on different chips. A type of the memory and a manner of disposing the memory and the processor are not limited in embodiments of this application.

It should be understood that, a related data exchange process such as sending of indication information may be a process of outputting the indication information from the processor, and receiving of capability information may be a process of receiving the input capability information by the processor. In some embodiments, data output by the processor may be output to the transmitter, and input data received by the processor may be from the receiver. The transmitter and the receiver may be collectively referred to as a transceiver.

The processing apparatus according to the tenth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to an eleventh aspect, a computer program product is provided. The computer program product includes a computer program (which may also be referred to as code or an instruction). When the computer program is run, a computer is enabled to perform the method according to any one of the first aspect to the fourth aspect and the possible embodiments of the first aspect to the fourth aspect.

According to a twelfth aspect, a computer-readable medium is provided. The computer-readable medium stores a computer program (also referred to as code or an instruction). When the computer program is run on a computer, a computer is enabled to perform the method according to any one of the first aspect to the fourth aspect and the possible embodiments of the first aspect to the fourth aspect.

According to a thirteenth aspect, a communication system is provided. The communication system includes the core network device, the access network device, and the terminal device.

DESCRIPTION OF EMBODIMENTS

The following describes the technical solutions in this application with reference to the accompanying drawings.

The technical solutions in embodiments of this application may be applied to various communication systems such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system or a new radio (NR) system, a vehicle-to-everything (V2X) system, a long term evolution-vehicle (LTE-V) system, an internet of vehicles system, a machine type communication (MTC) system, an internet of things (IoT) system, a long term evolution-machine (LTE-M) system, and a machine to machine (M2M) system, where V2X may include vehicle to network (V2N), vehicle to vehicle (V2V), vehicle to infrastructure (V2I), vehicle to pedestrian (V2P), and the like.

Figure 1:
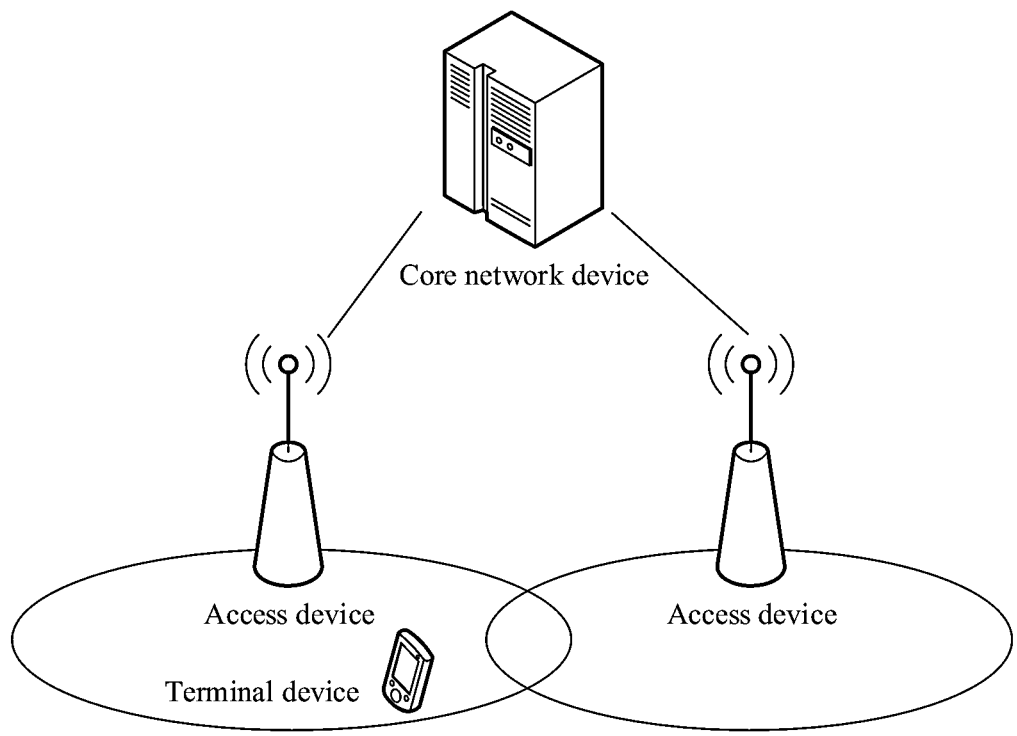
FIG. 1 is a schematic diagram of a structure of an example of a communication system according to this application.

FIG. 1 is a schematic diagram of a wireless communication system 100 applicable to an embodiment of this application.

As shown in FIG. 1, the wireless communication system 100 may include at least one core network device, for example, a core network device 101 shown in FIG. 1. The wireless communication system 100 may further include at least one access device, for example, terminal devices 102 and 103 shown in FIG. 1. The wireless communication system 100 may further include at least one terminal device, for example, a terminal device 104 shown in FIG. 1.

In embodiments of this application, the terminal device may also be referred to as user equipment (UE), an access terminal, a subscriber unit, a subscriber station, a mobile station, a mobile station, a remote station, a remote terminal, a mobile device, a user terminal, a terminal, a wireless communication device, a user agent, or a user apparatus. The terminal device in embodiments of this application may be a mobile phone, a tablet computer (PAD), a computer having wireless transmission and reception functions, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like.

The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn by a user or integrated into clothes or an accessory of a user. The wearable device is not only a hardware device, but also implements a powerful function through software support, a data exchange, and cloud interaction. Generalized wearable intelligent devices include full-featured and large-size devices that can implement complete or partial functions without depending on smartphones, for example, smart watches or smart glasses, and devices that focus on only one type of application function and work with other devices such as smartphones, for example, various smart bands or smart jewelry for monitoring physical signs.

In addition, the terminal device may alternatively be a terminal device in an internet of things (IoT) system. The IoT is an important part in development of future information technologies. A main technical feature of the IoT is to connect an object to a network by using a communication technology, to implement an intelligent network for human-machine interconnection and thing-thing interconnection.

It should be understood that a specific form of the terminal device is not limited in this application.

In embodiments of this application, the access device may be any device having a wireless transceiver function. The device includes but is not limited to an evolved NodeB (eNB), a next generation eNodeB (ng-eNB) connected to the 5th generation core network (5GC), a radio network controller (RNC), a NodeB (NB), a base station controller (BSC), a base transceiver station (BTS), a home base station (for example, a home evolved NodeB, or a home NodeB, HNB) 1, a baseband unit (BBU), an access point (AP) in a wireless fidelity (Wi-Fi) system, a wireless relay node, a wireless backhaul node, a transmission point (TP), a transmission and reception point (TRP), or the like, or may be a gNB or a transmission point (TRP or TP) in a 5G (for example, NR) system, or one or a group of antenna panels (including a plurality of antenna panels) of a base station in a 5G system, or may be a network node that constitutes a gNB or a transmission point, for example, a baseband unit (BBU) or a distributed unit (DU).

The access device provides a cell with a service, and the terminal device communicates with the cell by using transmission resources (for example, frequency domain resources or spectrum resources) allocated by the access device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells are characterized by small coverage and a low transmit power, and are applicable to providing a high-rate data transmission service.

Figure 2:
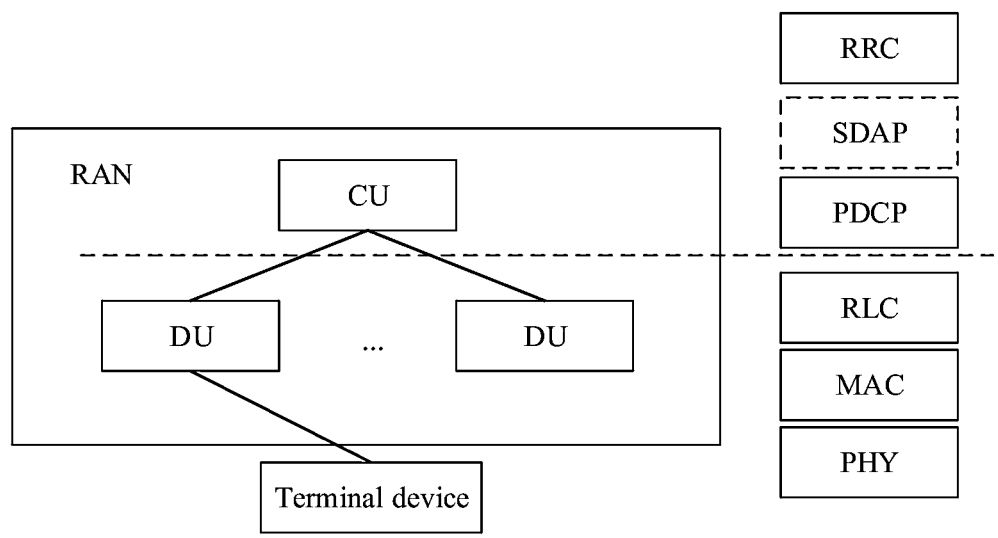
FIG. 2 is a schematic diagram of a structure of an example of an access device according to this application.

FIG. 2 is a schematic diagram of a network architecture according to an embodiment of this application. As shown in FIG. 2, an access device may include a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communication system, a RAN device (eNB) includes a baseband apparatus and a radio frequency apparatus. The radio frequency apparatus may be remotely disposed relative to the baseband apparatus. For example, a remote radio unit (remote radio unit, RRU) is remotely disposed relative to a BBU.

Communication between the RAN device and a terminal device complies with a specified protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In an embodiment, a service data adaptation protocol (SDAP) layer is further included above the PDCP layer.

The functions of these protocol layers may be implemented by one node, or may be implemented by a plurality of nodes. For example, in an evolved structure, a RAN device may include a centralized unit (CU) and a distributed unit (DU). A plurality of DUs may be centrally controlled by one CU.

As shown in FIG. 2, a CU and a DU may be divided based on a protocol layer of a wireless network. For example, functions of both the PDCP layer and a layer above the PDCP layer are set on the CU, and functions of protocol layers below the PDCP layer, such as the RLC layer and the MAC layer, are set on the DU. In other words, the CU has functions of layers (including the PDCP layer, an RRC layer, and an SDAP layer) above the PDCP layer, and the DU has functions of layers (including the RLC layer, the MAC layer, and a PHY layer) below the PDCP layer.

Division based on the protocol layer is merely an example, and division may alternatively be performed based on another protocol layer, such as the RLC layer. Functions of both the RLC layer and a protocol layer above the RLC layer are set on the CU, and a function of a protocol layer below the RLC layer is set on the DU. Alternatively, division is performed based on a protocol layer. For example, some functions of the RLC layer and a function of a protocol layer above the RLC layer are set on the CU, and a remaining function of the RLC layer and a function of a protocol layer below the RLC layer are set on the DU. In addition, the division may alternatively be performed in another manner. For example, the division is performed based on a latency. A function whose processing time needs to satisfy a latency requirement is set on the DU, and a function whose processing time does not need to satisfy the latency requirement is set on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 3:
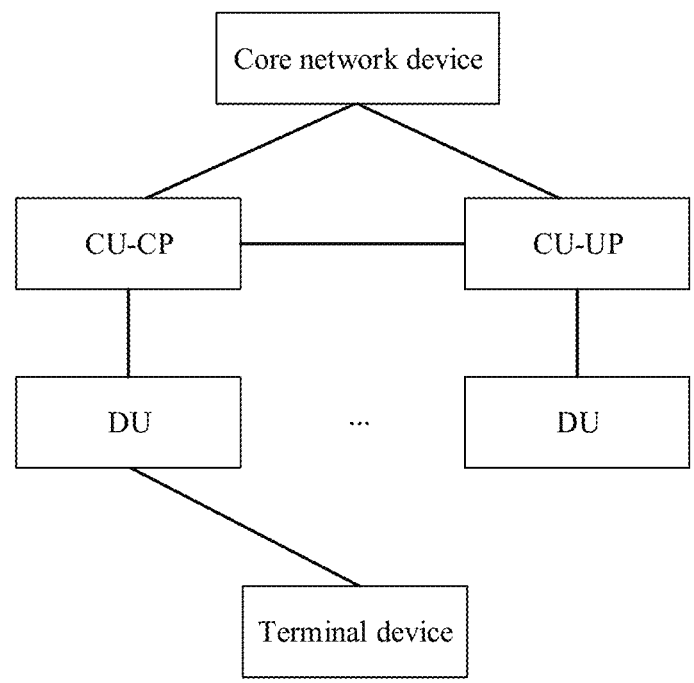
FIG. 3 is a schematic diagram of a structure of another example of an access device according to this application.

FIG. 3 is another schematic diagram of a network architecture applicable to an embodiment of this application. Compared with that in the architecture shown in FIG. 2, a control plane (CP) and a user plane (UP) of a CU may be separated and implemented by using different entities. The different entities are respectively a control plane CU entity (CU-CP entity) and a user plane CU entity (CU-UP entity).

In the foregoing network architecture, signaling generated by the CU may be sent to a terminal device by using a DU, or signaling generated by a terminal device may be sent to the CU by using a DU. The DU may transparently transmit the signaling to the terminal device or the CU by directly encapsulating the signaling at a protocol layer without parsing the signaling. In the following embodiments, if transmission of such signaling between the DU and the terminal device is involved, sending or receiving the signaling by the DU includes this scenario. For example, signaling at an RRC layer or a PDCP layer is finally processed as signaling at a PHY layer and the signaling at the PHY layer is sent to the terminal device, or signaling at an RRC layer or a PDCP layer is converted from received signaling at a PHY layer. In this architecture, it may also be considered that the signaling at the RRC layer or the PDCP layer is sent by the DU, or sent by the DU and a radio frequency.

In the foregoing embodiments, the CU is classified as a network device on a RAN side. In addition, the CU may alternatively be classified as a network device on a CN side. This is not limited herein.

The apparatus in the following embodiments of this application may be located in the terminal device or the network device based on a function implemented by the apparatus. When the foregoing CU-DU structure is used, a network device may be a CU node, a DU node, or a RAN device including a CU node and a DU node.

Figure 4:
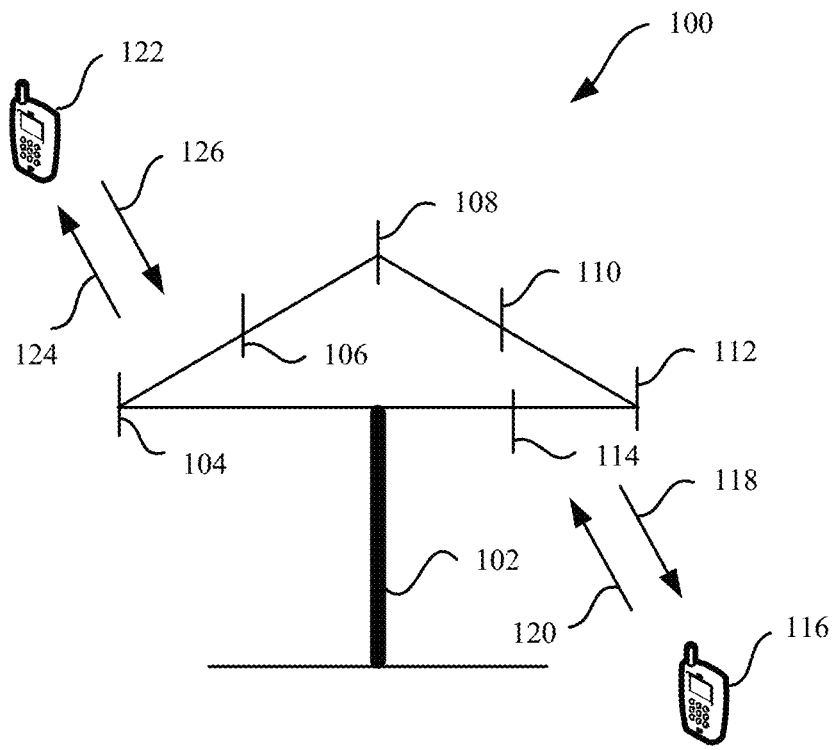
FIG. 4 is a schematic diagram of a structure of another example of a communication system according to this application.

FIG. 4 is a schematic diagram of a system 100 to which a communication method according to an embodiment of this application is applicable. As shown in FIG. 4, the system 100 includes an access device 102. The access device 102 may include one or more antennas, for example, antennas 104, 106, 108, 110, 112, and 114. In addition, the access device 102 may additionally include a transmitter chain and a receiver chain. A person of ordinary skill in the art can understand that the transmitter chain and the receiver chain may include a plurality of components (for example, a processor, a modulator, a multiplexer, a demodulator, a demultiplexer, or an antenna) related to signal sending and receiving.

The access device 102 may communicate with a plurality of terminal devices (for example, a terminal device 116 and a terminal device 122). However, it can be understood that the access device 102 may communicate with any quantity of terminal devices that are similar to the terminal device 116 or the terminal device 122. The terminal device 116 and the terminal device 122 each may be, for example, a cellular phone, a smartphone, a portable computer, a handheld communication device, a handheld computing device, a satellite radio apparatus, a global positioning system, a PDA, and/or any other suitable device used for communication in the wireless communication system 100.

As shown in FIG. 4, the terminal device 116 communicates with the antenna 112 and the antenna 114. The antennas 112 and 114 send information to the terminal device 116 over a forward link (which is also referred to as a downlink) 118, and receive information from the terminal device 116 over a reverse link (which is also referred to as an uplink) 120. In addition, the terminal device 122 communicates with the antenna 104 and the antenna 106. The antenna 104 and the antenna 106 each send information to the terminal device 122 over a forward link 124, and receive information from the terminal device 122 over a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or antenna group including a plurality of antennas) and/or zone designed for communication are/is referred to as a sector of the access device 102. For example, an antenna group may be designed to communicate with a terminal device in a sector within coverage of the access device 102. The access device may send, through a single antenna or a multi-antenna transmit diversity, signals to all terminal devices in a corresponding sector. In a process in which the access device 102 communicates with the terminal devices 116 and 122 respectively over the forward links 118 and 124, a transmit antenna of the access device 102 may improve signal-to-noise ratios of the forward links 118 and 124 through beamforming. In addition, compared with a manner in which an access device sends, through a single antenna or a multi-antenna transmit diversity, signals to all terminal devices served by the access device, less interference is caused to a mobile device in a neighboring cell when the access device 102 sends signals through beamforming to the terminal devices 116 and 122 that are randomly scattered in the related coverage.

In a given time, the access device 102, the terminal device 116, or the terminal device 122 may be a wireless communication sending apparatus and/or a wireless communication receiving apparatus. When sending data, the wireless communication sending apparatus may encode data for transmission. In some embodiments, the wireless communication sending apparatus may obtain (for example, generate, receive from another communication apparatus, or store in a memory) a quantity of data bits to be sent on a channel to the wireless communication receiving apparatus. The data bits may be included in a transport block (or a plurality of transport blocks) of the data, and the transport block may be segmented to generate a plurality of code blocks.

In addition, the communication system 100 may be a PLMN network, a D2D network, an M2M network, an IoT network, or another network. FIG. 4 is merely a simplified schematic diagram used as an example. The network may further include another access device, which is not shown in FIG. 4.

In addition, aspects or features of this application may be implemented as a method, an apparatus, or a product that uses standard programming and/or engineering technologies. The term "product" used in this application covers a computer program that can be accessed from any computer-readable device, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to radio channels and various other media that can store, include, and/or carry instructions and/or data.

In addition, to facilitate understanding of embodiments of this application, the following several descriptions are provided.

First, in this application, "being used to indicate" may include "being used to directly indicate" and "being used to indirectly indicate". When indication information is described as being used to indicate A, the indication information may be used to directly indicate A or used to indirectly indicate A, but it does not necessarily indicate that the indication information includes A.

Information used for indication may be referred to as to-be-indicated information. In an embodiment, the to-be-indicated information may be indicated in a plurality of manners. For example, the to-be-indicated information may be directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, information may alternatively be indicated by using an arrangement sequence of a plurality of pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information. When a plurality of pieces of information of a same type are indicated, indication manners of different pieces of information may be different. In an embodiment, an indication manner may be selected according to a specific requirement. The selected indication manner is not limited in embodiments of this application. In this way, the indication manner in embodiments of this application should be understood as covering various methods that can enable a to-be-indicated party to learn of the to-be-indicated information.

The to-be-indicated information may be sent as a whole, or may be divided into a plurality of pieces of sub-information for separate sending. In addition, sending periodicities and/or sending occasions of the sub-information may be the same or may be different. A specific sending method is not limited in this application. The sending periodicities and/or the sending occasions of the sub-information may be predefined, for example, predefined according to a protocol, or may be configured by a transmit end device by sending configuration information to a receive end device. For example, the configuration information may include but is not limited to one or a combination of at least two of radio resource control signaling, MAC layer signaling, and physical layer signaling. The radio resource control signaling includes, for example, RRC signaling. The MAC layer signaling includes, for example, a MAC control element (CE). The physical layer signaling includes, for example, downlink control information (DCI).

Second, the terms "first", "second", and various numbers in the following embodiments are merely used for differentiation for ease of description, and are not used to limit the scope of embodiments of this application. For example, the terms are used to distinguish between different preset correspondences.

Third, in the following embodiments, "being preset" may include "being indicated by the network device by using signaling or "being predefined", for example, "being defined in a protocol". Herein, "predefined" may be implemented in a manner in which corresponding code, a table, or other related indication information is pre-stored in a device (for example, including user equipment and a network device). A specific embodiment is not limited in this application.

Fourth, "storage" in embodiments of this application may be storage in one or more memories. The one or more memories may be separately disposed, or may be integrated into an encoder, a decoder, a processor, or a communication apparatus. Alternatively, a part of the one or more memories may be separately disposed, and a part of the one or more memories are integrated into an encoder, a decoder, a processor, or a communication apparatus. A type of the memory may be a storage medium in any form. This is not limited in this application.

Fifth, a "protocol" in embodiments of this application may be a standard protocol in the communication field, for example, may include an LTE protocol, an NR protocol, and a related protocol applied to a future communication system. This is not limited in this application.

Sixth, a network device mentioned in this application may include but is not limited to an access device and a core network device. Operations performed by the network device may be performed by a network element in the access network device, the core network device, or the network device. This is not limited in this application.

For ease of understanding embodiments of this application, the following briefly describes several basic concepts involved in embodiments of this application.

1. Inactive State

After an access device configures a terminal device to enter the inactive state, a core network device, the access device, and the terminal device retain a context of the terminal device in a network, and an NG association of the terminal device is also reserved between the access device and the core network device. That is, the core network device considers that the terminal device is still in a connected state unless the access device reports that the terminal device is in the inactive state. Therefore, when user data arrives at the core network, the core network device directly sends the data to the access device, and the access device initiates, within a RAN notification area (RNA), RAN paging to page the terminal device in the inactive state.

2. RAN Notification Area

An NR Protocol defines a radio access network-based notification area RNA. The RNA includes one or more cells. If the RNA includes a plurality of cells, the plurality of cells belong to a same access device, or may belong to different access devices, and the different access devices may be access devices of a same radio access type (RAT), or may be access devices of different RATs.

When a terminal device is in an inactive state, a network side (for example, an access device or a core network device) is not notified when the terminal device moves within an RNA, and is notified only when the terminal device moves to an area outside the RNA. When data of the terminal device arrives at a core network, the core network transfers the data to an access network device RAN #A, and the RAN #A initiates RAN paging in the RNA, that is, pages the terminal device in a cell included in the RNA. When the RNA includes a cell of another access network device, for example, a cell of a RAN #B, the RAN #A initiates RAN paging (RAN paging of an Xn Interface Application Protocol) to the RAN #B through an Xn interface between the RAN #A and the RAN #B, to trigger the RAN #B to page the terminal device in the cell of the RAN #B in the RNA.

In this application, before the terminal device in the inactive state detects, on a paging occasion resource, downlink control information (DCI) that is sent by an access device and used to schedule a RAN paging message, the terminal device first detects a wake-up signal #1 (that is, an example of a first wake-up signal) on a wake-up signal resource corresponding to the paging occasion resource. The wake-up signal resource is one of a plurality of wake-up signal resources allocated by the terminal device, each of the plurality of wake-up signal resources corresponds to one paging occasion resource, and any one of the plurality of wake-up signal resources is used to carry the wake-up signal #1 (that is, the example of the first wake-up signal). The wake-up signal #1 is used to indicate the terminal device to detect, on the paging occasion resource corresponding to the wake-up signal resource that carries the wake-up signal #1, downlink control information used to schedule the paging message. That is, when the terminal device detects, on a wake-up signal resource #1 (that is, an example of a first resource), the wake-up signal #1 sent by the access device, the terminal device further detects, on a paging occasion resource #1 (that is, an example of a first paging occasion resource) corresponding to the wake-up signal resource #1, the DCI used to schedule the paging message. When the terminal device does not detect, on the wake-up signal resource #1, the wake-up signal #1 sent by the access device, the terminal device does not detect, on the paging occasion resource #1 corresponding to the wake-up signal resource #1, the DCI used to schedule the paging message. According to embodiments of this application, power consumption of the terminal device can be reduced, and electric energy can be saved.

As an example instead of a limitation, a wake-up signal is a segment of sequence.

The following describes in detail embodiments of the foregoing solutions of this application in a communication system with reference to accompanying drawings.

Figure 5:
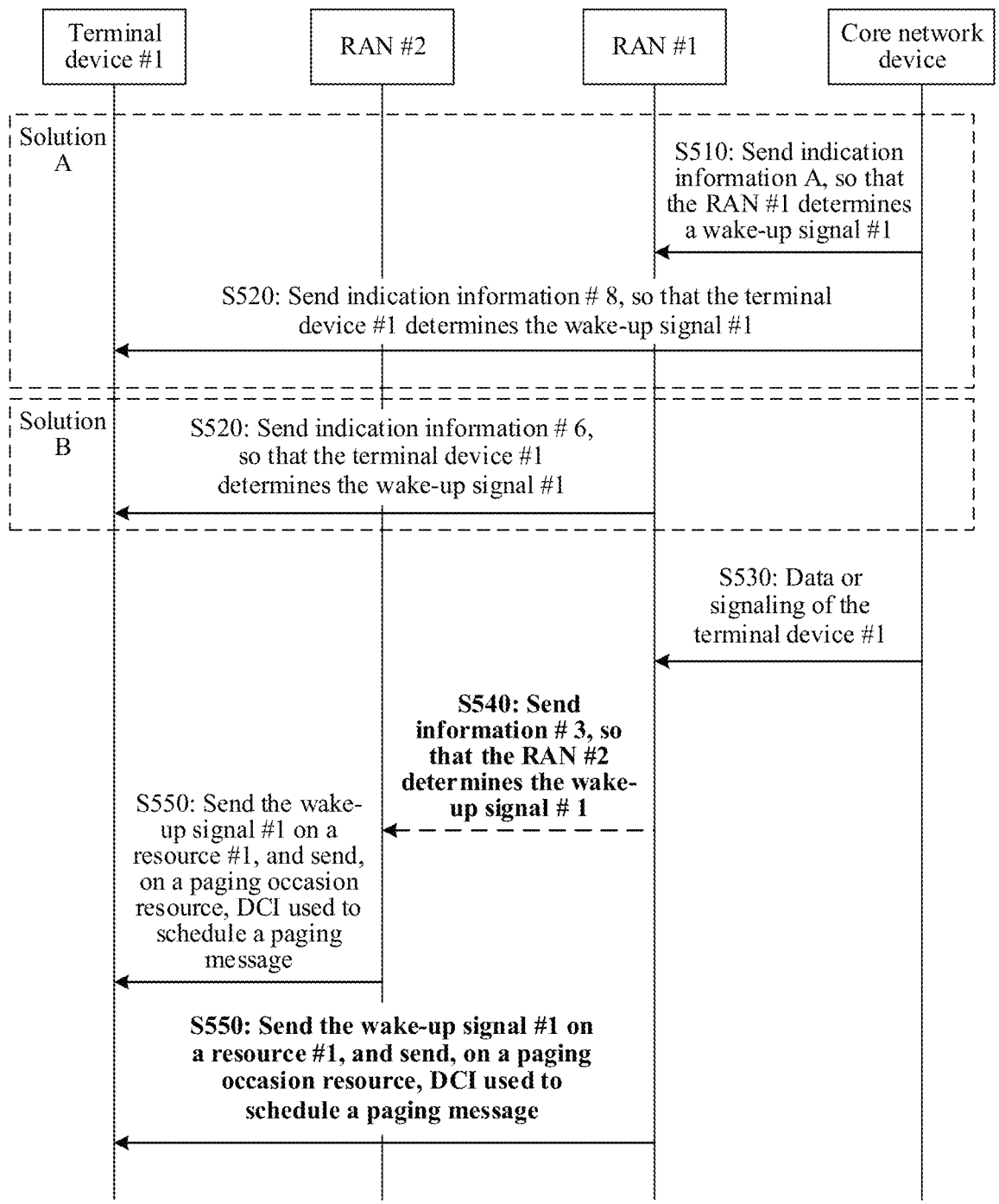
FIG. 5 is an example flowchart showing a paging message detection method according to an embodiment of this application.

FIG. 5 is an example flowchart of a paging message detection method according to an embodiment of this application.

In this application, a terminal device and a network device reach a consensus on a wake-up signal #1 sent on a wake-up signal resource, so that the terminal device can correctly receive the wake-up signal #1, to correctly indicate whether to detect DCI used to schedule a paging message. This reduces energy consumption.

To further reduce energy consumption, in this application, terminal devices are grouped. Different terminal device groups correspond to different wake-up signals, and one terminal device detects a wake-up signal corresponding to a terminal device group to which the terminal device belongs. In an embodiment, in this solution, the terminal devices may be grouped based on frequencies at which the terminal devices are paged. Terminal devices paged frequently are grouped into one group, and terminal devices paged rarely are grouped into one group. This avoids energy consumption caused by detecting the wake-up signal by the terminal device because a terminal device paged frequently is paged. That is, power consumption caused by detecting a paging message by a terminal device paged rarely can be further reduced in this solution. The following provides detailed descriptions with reference to FIG. 5.

FIG. 5 provides two possible solutions according to an embodiment of this application.

Solution A

S510: A core network device sends indication information A to an access device RAN #1 (that is, an example of a first access device), so that the RAN #1 determines the wake-up signal #1 based on the indication information A.

The RAN #1 determines, based on the received indication information A sent by the core network device, to indicate the terminal device to detect the wake-up signal #1 used to schedule a paging message. The indication information A includes but is not limited to the following forms.

Form 1 (That is, an Example of First Indication Information)

The indication information A is used to indicate a value of a parameter #1 (that is, an example of a first parameter) of a terminal device #1 (that is, an example of a first terminal device).

After receiving the indication information A, the RAN #1 determines the wake-up signal #1 based on the value of the parameter #1 of the terminal device #1 and according to a mapping rule #1 (that is, an example of a first mapping rule). The wake-up signal #1 is used to indicate the terminal device #1 to detect a wake-up signal of DCI used to schedule a RAN paging message. Before sending the paging message to the terminal device #1, the RAN #1 sends the wake-up signal #1 to the terminal device #1, to indicate the terminal device to detect the DCI used to schedule the paging message.

As an example instead of a limitation, the parameter #1 may be one or more of a probability that the terminal device is paged, a frequency at which the terminal device is paged, or a movement status of the terminal device.

As an example instead of a limitation, the mapping rule #1 is used to indicate a one-to-one correspondence between n value ranges of the parameter #1 and n wake-up signals, and the wake-up signal #1 is one of the n wake-up signals. That is, a grouping manner of the terminal devices is that terminal devices whose values of the parameter #1 fall within a same value range are grouped to one terminal device group, each terminal device group corresponds to one wake-up signal, and the terminal device #1 belongs to a terminal device group corresponding to the wake-up signal #1.

As an example instead of a limitation, the mapping rule #1 is preset in a system or specified in a protocol, or the mapping rule #1 is formulated by the RAN #1 based on a current network situation. For example, the mapping rule #1 is determined by the RAN #1 based on statistical values of a probability that a currently serving terminal device is paged or a frequency at which the currently serving terminal device is page within a period of time. If the RAN #1 determines that the statistical values of the frequency at which the currently serving terminal device is paged within a period of time are differentiated, the RAN #1 sets the mapping rule #1 to include two value ranges (for example, the two value ranges are obtained when the value of the parameter #1 is Q) of the parameter #1, and the two value ranges correspond to two wake-up signals: the wake-up signal #1 and a wake-up signal #2. However, this application is not limited thereto.

In some embodiments, the RAN #1 sends, to the terminal device #1, indication information used to indicate the mapping rule #1.

The RAN #1 sends, to the terminal device #1, the indication information used to indicate the mapping rule #1, so that the terminal device #1 can determine, according to the mapping rule #1, the wake-up signal #1 to be detected by the terminal device #1, and the terminal device #1 and the RAN #1 reach a consensus on the wake-up signal #1 to be detected by the terminal device, to ensure that the paging message is correctly sent and received.

As an example instead of a limitation, the indication information used to indicate the mapping rule #1 is carried in a broadcast message or cell specific configuration information sent by the RAN #1.

Form 2 (That is, an Example of Second Indication Information)

The indication information A is used to indicate a terminal device group #1 (that is, an example of a first terminal device group) to which a terminal device #1 belongs.

The terminal devices are divided into a plurality of terminal device groups, and each terminal device group corresponds to one wake-up signal. The RAN #1 determines, based on the indication information A sent by the core network device, the terminal device group #1 to which the terminal device #1 belongs, and further determines that a wake-up signal corresponding to the terminal device group #1 is the wake-up signal #1. Before sending the paging message to the terminal device #1, the RAN #1 sends the wake-up signal #1 to the terminal device #1, to indicate the terminal device to detect DCI used to schedule the paging message.

The terminal device group #1 to which the terminal device #1 belongs may be indicated in but is not limited to the following manners.

Manner A: The indication information A may indicate a grouping status of the terminal device group. That is, the indication information A indicates a terminal device included in each of the plurality of terminal device groups.

For example, the indication information A indicates that the terminal devices are divided into three terminal device groups: terminal device groups A, B, and C, and a terminal device included in each terminal device group. The RAN #1 determines, based on the received indication information A sent by the core network device, a terminal device group to which the terminal device #1 belongs. If the terminal device group B includes an identifier of the terminal device #1, it is determined that the terminal device #1 belongs to the terminal device group B. In this case, a wake-up signal corresponding to the terminal device group B is the wake-up signal #1. A wake-up signal corresponding to each terminal device group may be preset in a system or specified in a protocol.

In some embodiments, the indication information A further includes the wake-up signal corresponding to each of the terminal device groups or an index value of the wake-up signal.

In other words, the indication information A indicates the grouping status of the terminal devices and indicates the wake-up signal corresponding to each terminal device. The RAN #1 may determine, based on the indication information A, a group to which each terminal device belongs and the wake-up signal corresponding to each group.

Manner B: The indication information A indicates a terminal device group to which the terminal device #1 belongs.

For example, the indication information A indicates an index value of the terminal device group to which the terminal device #1 belongs, and the RAN #1 determines, based on the index value of the terminal device group in the indication information A, the terminal device group to which the terminal device #1 belongs, that is, the terminal device group #1, to further determine that a wake-up signal corresponding to the terminal device group #1 is the wake-up signal #1.

Manner C: The indication information A indicates the wake-up signal #1 or an index value of the wake-up signal #1. That is, the core network device directly notifies the RAN #1 of the wake-up signal #1 by using the indication information A.

After receiving the indication information A, the RAN #1 determines to send the wake-up signal #1 to the terminal device #1, to indicate the terminal device #1 to detect, on a paging occasion resource #1, the DCI used to schedule the paging message.

Form 3 (that is, an example of fifth indication information)

The indication information A is used to indicate that the terminal device #1 supports detecting the wake-up signal #1.

The terminal device #1 sends, in one communication, capability information of the terminal device #1 to a RAN #X connected to the core network device, where the capability information is used to indicate whether the terminal supports detecting the wake-up signal. That is, the capability information is used to indicate whether the terminal device supports detecting a scheduling paging message on a corresponding paging occasion resource by using a wake-up signal indication. The core network device stores the capability information after obtaining the capability information that is forwarded by the RAN #X. After the terminal device #1 is connected to the RAN #1 that is connected to the core network device, the core network device sends the stored capability information of the terminal device #1 to the RAN #1 by using the indication information A, to notify the RAN #1 whether the terminal device #1 supports detecting the wake-up signal. When the indication information A indicates that the terminal device #1 supports detecting the wake-up signal, after the terminal device #1 enters the inactive state, the RAN #1 sends the wake-up signal #1 to the terminal device #1 before sending a paging message to the terminal device #1. Whether the terminal device supports detecting the wake-up signal before detecting a paging occasion may be: whether the terminal device in an idle state and/or the inactive state supports detecting the wake-up signal before detecting the paging occasion, or whether the terminal device in any state (for example, a connected state, the idle state, and the inactive state) supports detecting the wake-up signal before detecting the paging occasion. However, this application is not limited thereto.

In Form 3, the wake-up signal #1 may be preset in a system or specified in a protocol. That is, when any terminal device can support detecting a scheduling paging message on a corresponding paging occasion resource by using a wake-up signal indication, the wake-up signal detected before the paging occasion is detected is the wake-up signal #1. In other words, each terminal device that supports detecting a wake-up signal detects a same wake-up signal, that is, the wake-up signal #1.

It should be noted that the three forms of the indication information A may be used in combination with each other. For example, Form 3 is combined with Form 1 or Form 2. The core network device first determines whether the terminal device supports detecting the wake-up signal, and then determines the to-be-detected wake-up signal #1 if the terminal device supports detecting the wake-up signal, for example, determines the wake-up signal #1 by using the parameter #1 of the terminal device #1 or determine the wake-up signal #1 by using the terminal device group to which the terminal device belongs. However, this application is not limited thereto.

For example, the core network device notifies, by using indication information A1, the RAN #1 whether the terminal device #1 supports detecting the wake-up signal. When the indication information A1 indicates that the terminal device #1 does not support detecting the wake-up signal, the RAN #1 does not send the wake-up signal to the terminal device #1 before sending the paging message to the terminal device #1. When the indication information A1 indicates that the terminal device #1 supports detecting the wake-up signal, the RAN #1 indicates, by using indication information A2 sent by the core network device, to determine the wake-up signal #1 to be detected by the terminal device. The indication information A1 and the indication information A2 may be carried in a same message or different messages to be sent to the RAN #1. This is not limited in this application.

As an example instead of a limitation, the indication information A is transferred by using an NG interface message that is between the core network device and the RAN #1 and related to the terminal device.

The indication information A is an indication sent by the core network device to the RAN #1 when the terminal device #1 remains in the connected state or in the inactive state, and an interface resource related to the terminal device is reserved between the core network device and the RAN #1 device. Therefore, the indication information A may be transferred by using the NG interface message that is between the core network device and the RAN #1 and related to the terminal device.

In some embodiments, the indication information A is carried in core network assistance information for RRC inactive of the NGAP.

S520: The core network device sends indication information #8 (that is, an example of eighth indication information) to the terminal device #1, so that the terminal device determines the wake-up signal #1. That is, the terminal device determines the to-be-detected wake-up signal #1 based on an indication of the core network device.

As an example instead of a limitation, the indication information #8 is used to indicate the value of the parameter #1 of the terminal device #1.

After receiving the indication information #8, the terminal device #1 determines, based on the value of the parameter #1 and according to the mapping rule #1, the wake-up signal #1 to be detected by the terminal device. For the parameter #1, the mapping rule #1, and a manner in which the terminal device determines the wake-up signal #1, refer to the descriptions of Form 1 of the indication information A. For brevity, details are not described herein again.

As an example instead of a limitation, the indication information #8 is used to indicate the wake-up signal #1 or the index value of the wake-up signal #1.

The core network device directly notifies, by using the indication information #8, the terminal device #1 of a to-be-detected wake-up signal or an index value of the wake-up signal, so that the terminal device determines the to-be-detected wake-up signal.

As an example instead of a limitation, the indication information #1 is carried in a non-access stratum (NAS) message sent by the core network device to the terminal device #1.

Solution B

S520: The RAN #1 sends indication information #6 to the terminal device #1, so that the terminal device #1 determines the to-be-detected wake-up signal #1.

In this solution, the terminal device #1 obtains the to-be-detected wake-up signal #1 through the RAN #1. The RAN #1 may determine, by using information that is recorded or stored in the RAN #1 and that is about movement or being paged of the UE, the wake-up signal #1 to be detected by the terminal device #1, or may determine the wake-up signal #1 by using the method described in S510. However, this application is not limited thereto.

As an example instead of a limitation, the indication information #6 is carried in one or more of the following messages: an RRC configuration message, an RRC reconfiguration message, or an RRC release message.

As an example instead of a limitation, the indication information #6 is used to indicate a value of a parameter #1 of the terminal device #1.

After receiving the indication information #6, the terminal device #1 determines, based on the value of the parameter #1 and according to a mapping rule #1, the wake-up signal #1 to be detected by the terminal device. For the parameter #1, the mapping rule #1, and a manner in which the terminal device determines the wake-up signal #1, refer to the description of Form 1 of the indication information A. For brevity, details are not described herein again.

As an example instead of a limitation, the indication information #6 is used to indicate the wake-up signal #1 or an index value of the wake-up signal #1.

The core network device directly notifies, by using the indication information #6, the terminal device #1 of a to-be-detected wake-up signal or an index value of the wake-up signal, so that the terminal device determines the to-be-detected wake-up signal.

In some embodiments, the RAN #1 sends indication information #4 (that is, an example of fourth indication information) to the core network device, where the indication information #4 is used to indicate historical information of the terminal device #1.

The RAN #1 reports the historical information of the terminal device #1 during the inactive state to the core network device, so that the core network can update indication information A based on the historical information reported by the RAN #1, and can more accurately allocate the to-be-detected wake-up signal to the terminal device. This effectively reduces power consumption of the terminal device and saves electric energy.

As an example instead of a limitation, the historical information may include but is not limited to one or more pieces of the following information: a RAN paging probability, a quantity of RAN paging times, and RNA update information of the terminal device #1 during the inactive state, a downlink data volume and a downlink data interval of the terminal device in the connected state, and a moving speed and a quantity of handovers of the terminal device.

S530: The core network device transfers data or signaling of the terminal device #1 to the RAN #1.

S540: The RAN #1 sends indication information #3 to a RAN #2, so that the RAN #2 determines the wake-up signal #1.

S550: The RAN #1 and/or the RAN #2 sends the wake-up signal #1 on a resource #1, and send, on the paging occasion resource, the DCI used to schedule the paging message.

When the terminal device #1 is in the inactive state, the core network device does not perceive that the terminal device #1 is still in the connected state. Therefore, when the data or signaling of the terminal device #1 arrives at the core network device, the core network device transfers the data or signaling of the terminal device #1 to the RAN #1 by using an NG interface resource that is between the core network device and the RAN #1 and related to the terminal device #1.

When an RNA of the terminal device includes a cell of another RAN (for example, the RAN #2) other than the RAN #1, the RAN #1 performs S540, and the RAN #2 sends the indication information #3, and determines the wake-up signal #1 based on the indication information #3. When the RNA of the terminal device includes only the cell of the RAN #1, S540 is performed.

As an example instead of a limitation, the indication information #3 is used to indicate the value of the parameter #1 of the terminal device #1.

The RAN #2 determines the wake-up signal #1 based on the value of the parameter #1 of the terminal device #1 indicated by the indication information #3 and according to the mapping rule #1. For the parameter #1, the mapping rule #1, and a manner in which the RAN #2 determines the wake-up signal #1, refer to the description of Form 1 of the indication information A. For brevity, details are not described herein again.

In some embodiments, the mapping rule #1 is preset in a system or specified in a protocol, or the RAN #1 further sends the mapping rule #1 to the RAN #2.

As an example instead of a limitation, the indication information #3 is used to indicate the terminal device group #1 to which the terminal device #1 belongs.

The RAN #2 determines, based on the indication information #3, the terminal device group #1 to which the terminal device #1 belongs, and further determines that the wake-up signal corresponding to the terminal device group #1 is the wake-up signal #1. For an indication manner of the terminal device group #1 to which the terminal device #1 belongs, refer to the description of the indication information A. Details are not described herein again.

As an example instead of a limitation, the indication information #3 is used to indicate that the terminal device #1 supports detecting the wake-up signal #1.

After receiving the indication information #3, the RAN #2 determines whether the terminal device #1 supports detecting the wake-up signal. When the indication information #3 indicates that the terminal device #1 supports detecting the wake-up signal, the RAN #2 sends the wake-up signal #1 to the terminal device #1 before sending the paging message to the terminal device #1. When the indication information #3 indicates that the terminal device #1 does not support detecting the wake-up signal, the RAN #2 does not send the wake-up signal #1 to the terminal device #1 before sending the paging message to the terminal device #1. Alternatively, when the terminal device #1 does not support detecting the wake-up signal, the RAN #1 does not send the indication information #3 to the RAN #2. When the RAN #2 receives no indication information #3, the RAN #2 does not send the wake-up signal before sending the paging message to the terminal device #1.

As an example instead of a limitation, the indication information #3 is carried in a RAN paging message sent by the RAN #1 to the RAN #2 through an Xn interface.

In some embodiments, the RAN #1 determines whether the value of the parameter #1 of the terminal device #1 is less than a preset threshold, to determine whether to send the wake-up signal #1 to the terminal device #1 before sending the paging message. Correspondingly, the terminal device #1 determines whether the value of the parameter #1 is less than the preset threshold, to determine whether to detect the wake-up signal #1. When the value of the parameter #1 of the terminal device #1 is less than the preset threshold, the RAN #1 sends the wake-up signal #1 to the terminal device #1 before sending the paging message, and the terminal device detects the wake-up signal #1 on the resource #1, and determines, based on a detection result of the wake-up signal #1, whether to detect, on the paging occasion resource #1, the wake-up signal #1 used to schedule the paging message.

When the value of the parameter #1 of the terminal device #1 is greater than the preset threshold, the RAN #1 does not send the wake-up signal #1 to the terminal device #1 before sending the paging message, and the terminal device detects, on each paging occasion resource #1, the DCI used to schedule the paging message.

In some embodiments, the RAN #1 sends the indication information #3 to the RAN #2 when determining that the value of the parameter #1 of the terminal device #1 is less than the preset threshold.

For example, according to the solution of this application, the value of the parameter #1 is compared with the preset threshold. When the value of the parameter #1 is less than the threshold, it is determined that the terminal device is not frequently paged. Therefore, the wake-up signal #1 is sent to the terminal device before the paging message is sent, to indicate the terminal device to detect, on the paging occasion resource #1, the DCI used to schedule the paging message. When the terminal device does not detect the wake-up signal #1 on the resource #1, the terminal device does not detect, on the paging occasion resource #1, the DCI used to schedule the paging message, so that power consumption of a terminal device paged rarely can be reduced. In addition, when the value of the parameter #1 is less than the threshold, the access device does not send the wake-up signal to the terminal device #1, and the terminal device detects, on each paging occasion resource #1, the DCI used to schedule the paging message, so that a terminal device paged frequently directly detects the DCI used to schedule the paging message instead of detecting the wake-up signal, to reduce a delay in detecting the paging message by the terminal device paged frequently.

The methods provided in embodiments of this application are described above in detail with reference to FIG. 5. The following describes in detail apparatuses provided in embodiments of this application with reference to FIG. 6 to FIG. 8.

Figure 6:
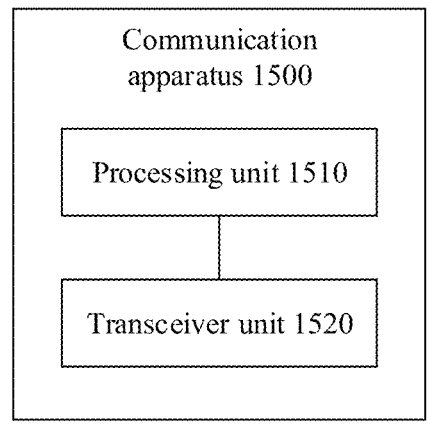
FIG. 6 is a schematic block diagram of an example of a wireless communication apparatus applicable to an embodiment of this application.

FIG. 6 is a schematic block diagram of a communication apparatus according to an embodiment of this application. As shown in FIG. 6, a communication apparatus 1500 may include a processing unit 1510 and a transceiver unit 1520.

In a possible design, the communication apparatus 1500 may correspond to the terminal device in the foregoing method embodiments, for example, may be a terminal device, or a chip configured in the terminal device.

It should be understood that, the communication apparatus 1500 may correspond to the terminal device in the method 500 according to embodiments of this application. The communication apparatus 1500 may include units configured to perform the method performed by the terminal device in the method 500 in FIG. 5. In addition, the units in the communication apparatus 1500 and the foregoing other operations and/or functions are separately used to implement corresponding procedures of the method 500 in FIG. 5.

When the communication apparatus 1500 is configured to perform the method 500 in FIG. 6, the transceiver unit 1520 may be configured to perform S520 and S550 in the method 500. It should be understood that a specific process in which the units perform the foregoing corresponding operations is described in detail in the foregoing method embodiments. For brevity, details are not described herein.

Figure 7:
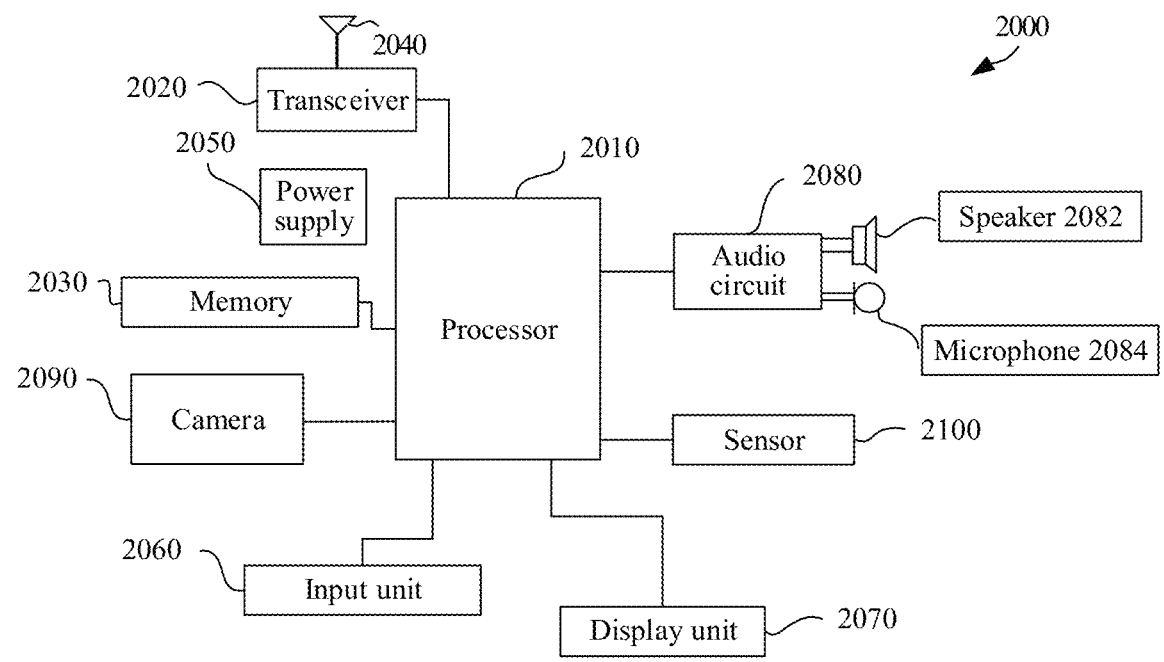
FIG. 7 is a schematic diagram of a structure of an example of a terminal device applicable to an embodiment of this application.

It should be further understood that when the communication apparatus 1500 is the terminal device, the transceiver unit 1520 in the communication apparatus 1500 may correspond to a transceiver 2020 in a terminal device 2000 shown in FIG. 7, and the processing unit 1510 in the communication apparatus 1100 may correspond to a processor 2010 in the terminal device 2000 shown in FIG. 7.

It should be further understood that, when the communication apparatus 1500 is the terminal device, the transceiver unit 1520 in the communication apparatus 1500 may be implemented through a communication interface (for example, a transceiver or an input/output interface), for example, may correspond to the transceiver 2020 in the terminal device 2000 shown in FIG. 7, and the processing unit 1510 in the communication apparatus 1500 may be implemented by using at least one processor, for example, may correspond to the processor 2010 in the terminal device 2000 shown in FIG. 7.

In some embodiments, the communication apparatus 1500 may further include the processing unit 1510. The processing unit 1510 may be configured to process instructions or data, to implement a corresponding operation.

In some embodiments, the communication apparatus 1500 may further include a storage unit. The storage unit may be configured to store instructions or data. The processing unit may invoke the instructions or the data stored in the storage unit, to implement a corresponding operation.

It should be understood that a specific process in which the units perform the foregoing corresponding operations is described in detail in the foregoing method embodiments. For brevity, details are not described herein.

In another possible design, the communication apparatus 1500 may correspond to the access device in the foregoing method embodiments, for example, may be an access device or a chip configured in the access device.

It should be understood that, the communication apparatus 1500 may correspond to the access device in the method 500 according to embodiments of this application. The communication apparatus 1500 may include units configured to perform the method performed by the access device in the method 500 in FIG. 5. In addition, the units in the communication apparatus 1500 and the foregoing other operations and/or functions are separately used to implement corresponding procedures of the method 500 in FIG. 5.

When the communication apparatus 1500 is configured to perform the method 500 in FIG. 5, the transceiver unit 1520 may be configured to perform S510, S530, and S540 in the method 500. It should be understood that a specific process in which the units perform the foregoing corresponding operations is described in detail in the foregoing method embodiments, and for brevity, details are not described herein.

Figure 8:
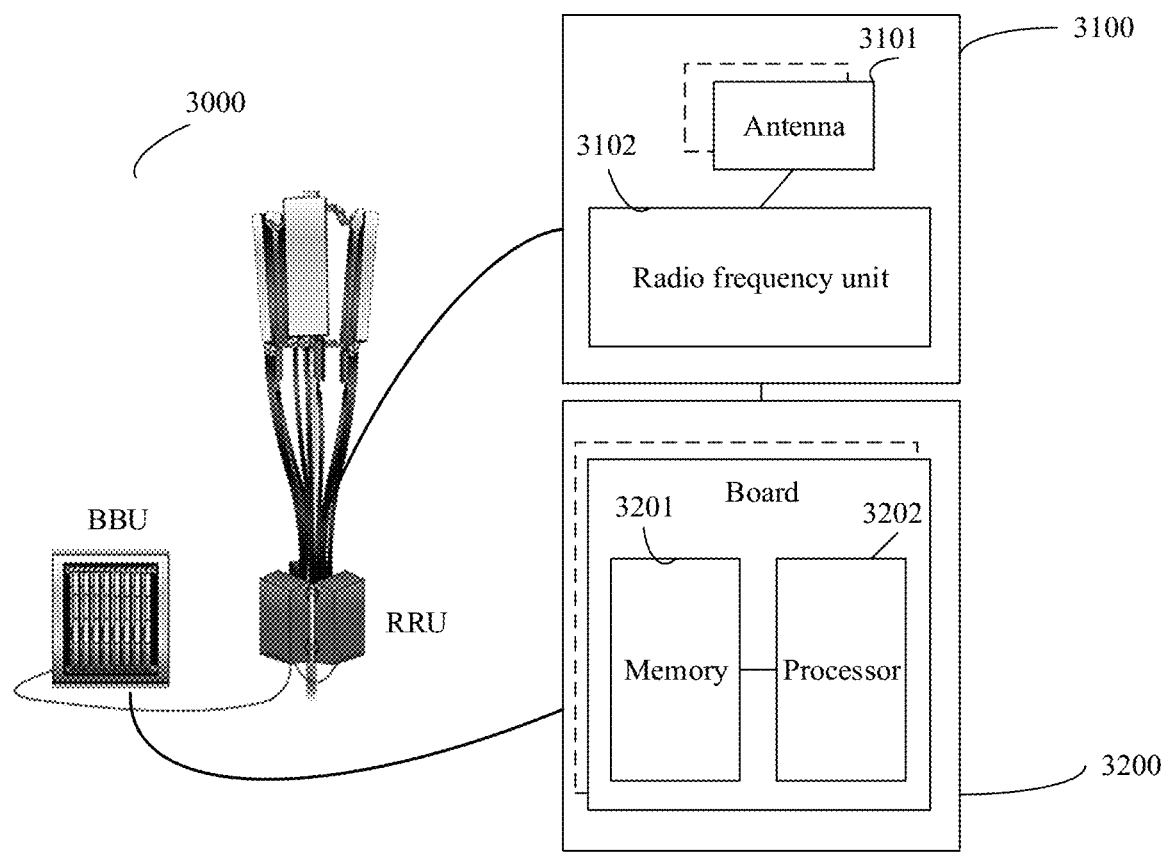
FIG. 8 is a schematic diagram of a structure of an example of an access device applicable to an embodiment of this application.

It should be further understood that, when the communication apparatus 1500 is an access device, the transceiver unit in the communication apparatus 1500 may correspond to a transceiver 3100 in an access device 3000 shown in FIG. 8. The processing unit 1510 in the communication apparatus 1500 may correspond to a processor 3202 in the access device 3000 shown in FIG. 8.

In some embodiments, the communication apparatus 1500 may further include the processing unit 1510. The processing unit 1510 may be configured to process instructions or data, to implement a corresponding operation.

In some embodiments, the communication apparatus 1500 may further include a storage unit. The storage unit may be configured to store instructions or data. The processing unit may invoke the instructions or the data stored in the storage unit, to implement a corresponding operation.

It should be understood that a specific process in which the units perform the foregoing corresponding operations is described in detail in the foregoing method embodiments. For brevity, details are not described herein.

It should be further understood that, when the communication apparatus 1500 is an access device, the transceiver unit 1520 in the communication apparatus 1500 may be implemented through a communication interface (for example, a transceiver or an input/output interface), for example, may correspond to the transceiver 3100 in the access device 3000 shown in FIG. 8, and the processing unit 1510 in the communication apparatus 1500 may be implemented by using at least one processor, for example, may correspond to the processor 3202 in the access device 3000 shown in FIG. 8.

In another possible design, the communication apparatus 1500 may correspond to the core network device in the foregoing method embodiments, for example, may be a core network device or a chip configured in the core network device.

It should be understood that, the communication apparatus 1500 may correspond to the core network device in the method 500 according to embodiments of this application. The communication apparatus 1500 may include units configured to perform the method performed by the access device in the method 500 in FIG. 5. In addition, the units in the communication apparatus 1500 and the foregoing other operations and/or functions are separately used to implement corresponding procedures of the method 500 in FIG. 5.

When the communication apparatus 1500 is configured to perform the method 500 in FIG. 5, the transceiver unit 1520 may be configured to perform S510 and S530 in the method 500. It should be understood that a specific process in which the units perform the foregoing corresponding operations is described in detail in the foregoing method embodiments. For brevity, details are not described herein.

In some embodiments, the communication apparatus 1500 may further include the processing unit 1510. The processing unit 1510 may be configured to process instructions or data, to implement a corresponding operation.

In some embodiments, the communication apparatus 1500 may further include a storage unit. The storage unit may be configured to store instructions or data. The processing unit may invoke the instructions or the data stored in the storage unit, to implement a corresponding operation.

It should be understood that a specific process in which the units perform the foregoing corresponding operations is described in detail in the foregoing method embodiments. For brevity, details are not described herein.

It should be further understood that, when the communication apparatus 1500 is an access device, the transceiver unit 1520 in the communication apparatus 1500 may be implemented through a communication interface (for example, a transceiver or an input/output interface), and the processing unit 1510 in the communication apparatus 1500 may be implemented by using at least one processor.

FIG. 7 is a schematic diagram of a structure of a terminal device 2000 according to an embodiment of this application. The terminal device 2000 may be used in the system shown in FIG. 1, to perform a function of the terminal device in the foregoing method embodiments. As shown in the figure, the terminal device 2000 includes a processor 2010 and a transceiver 2020. In some embodiments, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. In some embodiments, the terminal device 2000 may further include an antenna 2040, configured to send, through a radio signal, uplink data or uplink control signaling that is output by the transceiver 2020.

The processor 2010 and the memory 2030 may be integrated into one processing apparatus. The processor 2010 is configured to execute program code stored in the memory 2030 to implement the foregoing functions. In some embodiments, the memory 2030 may alternatively be integrated into the processor 2010, or may be independent of the processor 2010. The processor 2010 may correspond to the processing unit in FIG. 6.

The transceiver 2020 may correspond to the transceiver unit in FIG. 6. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 7 can implement processes related to the terminal device in the method embodiment shown in FIG. 5. Operations and/or functions of the modules in the terminal device 2000 are intended to implement the corresponding procedures in the foregoing method embodiment. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of sending to the access device or receiving from the access device that is performed by the terminal device and that is described in the foregoing method embodiments. For details, refer to the descriptions in the foregoing method embodiments. Details are not described herein again.

In some embodiments, the terminal device 2000 may further include a power supply 2050, configured to supply power to components or circuits in the terminal device.

In addition, to make functions of the terminal device more perfect, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 8 is a schematic diagram of a structure of an access device according to an embodiment of this application, for example, may be a schematic diagram of a structure of a base station.

It should be understood that a base station 3000 shown in FIG. 8 can implement processes related to the access device in the method embodiment shown in FIG. 5. Operations and/or functions of modules in the base station 3000 are intended to implement corresponding procedures in the foregoing method embodiment. For details, refer to the descriptions in the foregoing method embodiments. To avoid repetition, detailed descriptions are properly omitted herein.

It should be understood that the base station 3000 shown in FIG. 8 is merely a possible architecture of the access device, and should not constitute any limitation on this application. The method provided in this application is applicable to an access device having another architecture, for example, an access device including a CU, a DU, and an AAU. A specific architecture of the access device is not limited in this application.

An embodiment of this application further provides a processing apparatus, including a processor and an interface. The processor is configured to perform the method in any one of the foregoing method embodiments.

It should be understood that, the processing apparatus may be one or more chips. For example, the processing apparatus may be a field programmable gate array (FPGA), an application-specific integrated circuit (ASIC), a system on chip (SoC), a central processor unit (CPU), a network processor (NP), a digital signal processor (DSP), a micro controller unit (MCU), a programmable logic device (PLD), or another integrated chip.

In an embodiment, the operations in the foregoing methods may be completed by using a hardware integrated logic circuit in the processor or instructions in a form of software. The operations in the methods disclosed with reference to embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware in the processor. To avoid repetition, details are not described herein again.

It should be noted that, the processor in embodiments of this application may be an integrated circuit chip, and has a signal processing capability. In an embodiment, the operations in the foregoing method embodiments may be completed by using a hardware integrated logical circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the operations, and the logical block diagrams that are disclosed in embodiments of this application. The general-purpose processor may be a microprocessor, or the processor may be any conventional processor, or the like. The operations in the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware in the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. For example instead of a limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these types of memories and any memory of another appropriate type.

According to the methods provided in embodiments of this application, this application further provides a computer program product, and the computer program product includes computer program code. When the computer program code is run on a computer, the computer is enabled to perform the method in the embodiment shown in FIG. 5.

According to the methods provided in embodiments of this application, this application further provides a computer-readable medium. The computer-readable medium stores program code. When the program code is run on a computer, the computer is enabled to perform the method in the embodiment shown in FIG. 2, FIG. 5, and FIG. 8.

According to the methods provided in embodiments of this application, this application further provides a system. The system includes the foregoing one or more terminal devices and the foregoing one or more access devices.

The access device and the terminal device in the foregoing apparatus embodiments exactly correspond to the access device and the terminal device in the method embodiments. A corresponding module or unit performs a corresponding operation. For example, a communication unit (a transceiver) performs a receiving operation or a sending operation in the method embodiments, and an operation other than the sending operation and the receiving operation may be performed by a processing unit (a processor). For a function of a specific unit, refer to a corresponding method embodiment. There may be one or more processors.

All or some of the foregoing embodiments may be implemented by using software, hardware, firmware, or any combination thereof. When embodiments are implemented by using the software, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

The access device and the terminal device in the foregoing apparatus embodiments exactly correspond to the access device and the terminal device in the method embodiments. A corresponding module or unit performs a corresponding operation. For example, a communication unit (a transceiver) performs a receiving operation or a sending operation in the method embodiments, and an operation other than the sending operation and the receiving operation may be performed by a processing unit (a processor). For a function of a specific unit, refer to a corresponding method embodiment. There may be one or more processors.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may perform communication by using a local and/or remote process and according to, for example, a signal having one or more data packets (for example, data from two components interacting with another component in a local system, a distributed system, and/or across a network such as the internet interacting with other systems by using the signal).

A person of ordinary skill in the art may be aware that, in combination with the examples described in embodiments disclosed in this specification, units and algorithm operations can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed systems, apparatuses, and methods may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in embodiments.

In addition, functional units in embodiments of this application may be integrated into one processing unit, each of the units may exist alone physically, or two or more units are integrated into one unit.

In the foregoing embodiments, all or some of the functions of the functional units may be implemented by software, hardware, firmware, or any combination thereof. When embodiments are implemented by using the software, all or some of embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, an access device, or the like) to perform all or some of the operations in the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
   determining, by a first access device, a first resource when the first access device is to send a paging message to a first terminal device in an inactive state, wherein the first resource carries a first wake-up signal, and the first wake-up signal indicates the first terminal device to detect downlink control information for scheduling the paging message that is carried in a first paging occasion resource;
   sending, by the first access device, the first wake-up signal to the first terminal device on the first resource;
   sending, by the first access device on the first paging occasion resource, the downlink control information for scheduling the paging message; wherein the method further comprising:
   receiving, by the first access device, second indication information sent by a core network device, wherein the second indication information indicates a first terminal device group to which the first terminal device in the inactive state belongs;
   determining, by the first access device, the first terminal device group based on the second indication information, wherein the first terminal device group is one terminal device group in one or more terminal device groups, wherein each of the one or more terminal device groups corresponds to one wake-up signal, and wherein the first wake-up signal corresponds to the first terminal device group; and
   sending, by the first access device, seventh indication information to a second access device, wherein the second access device is an access device in a radio access network notification area (RNA) of the first terminal device, and the seventh indication information comprises at least one type of the following information:
   a value of a parameter of the first terminal device, the first wake-up signal, an index value of the first wake-up signal, grouping information of terminal devices, and information about the wake-up signal corresponding to each terminal device group.

2. The method according to claim 1, wherein the first wake-up signal is determined by the first access device based on a value of a first parameter of the first terminal device and according to a first mapping rule,
   wherein the first mapping rule indicates that each of n value ranges of the first parameter corresponds to one wake-up signal,
   wherein the first wake-up signal corresponds to a value range to which the value of the first parameter of the first terminal device belongs, and
   wherein n is an integer greater than or equal to 0.

3. The method according to claim 2, wherein the method further comprises:
   receiving, by the first access device, first indication information sent by a core network device, wherein the first indication information indicates the value of the first parameter of the first terminal device.

4. The method according to claim 1, wherein the method further comprises:
   receiving, by the first access device, fifth indication information sent by a core network device, wherein the fifth indication information indicates that the first terminal device supports detecting the first wake-up signal; and
   wherein the sending, by the first access device, the first wake-up signal to the first terminal device on the first resource comprises:
   sending, by the first access device, the first wake-up signal to the first terminal device on the first resource after determining, based on the fifth indication information, that the first terminal device supports detecting the first wake-up signal.

5. An apparatus, comprising:
   one or more processors in communications with a memory
   configured to store program instructions that are executable by the one or more processors;
   wherein the program instructions include instructions that, when executed, cause the apparatus to:
   determine a first resource when a first access device is to send a paging message to a first terminal device in an inactive state, wherein the first resource is to carry a first wake-up signal, and the first wake-up signal is to indicate the first terminal device to detect downlink control information for scheduling the paging message that is carried in a first paging occasion resource;
   send the first wake-up signal to the first terminal device on the first resource;
   send on the first paging occasion resource, the downlink control information for scheduling the paging message;
   receive second indication information sent by a core network device, wherein the second indication information is to indicate a first terminal device group to which the first terminal device in the inactive state belongs;
   determine the first terminal device group based on the second indication information, wherein the first terminal device group is one terminal device group in one or more terminal device groups, wherein each of the one or more terminal device groups corresponds to one wake-up signal, and wherein the first wake-up signal corresponds to the first terminal device group; and
   send seventh indication information to a second access device, wherein the second access device is an access device in a radio access network notification area (RNA) of the first terminal device, and the seventh indication information comprises at least one type of the following information:
a value of a parameter of the first terminal device, the first wake-up signal, an index value of the first wake-up signal, grouping information of terminal devices, and information about the wake-up signal corresponding to each terminal device group.

6. The apparatus according to claim 5, wherein the first wake-up signal is determined based on a value of a first parameter of the first terminal device and according to a first mapping rule,
wherein the first mapping rule is to indicate that each of n value ranges of the first parameter corresponds to one wake-up signal,
wherein the first wake-up signal corresponds to a value range to which the value of the first parameter of the first terminal device belongs, and
wherein n is an integer greater than or equal to 0.

7. The apparatus according to claim 6, wherein the program instructions include instructions that, when executed, further cause the apparatus to:
receive first indication information sent by a core network device, wherein the first indication information is to indicate the value of the first parameter of the first terminal device.

8. The apparatus according to claim 5, wherein the program instructions include instructions that, when executed, further cause the apparatus to:
receive fifth indication information sent by a core network device, wherein the fifth indication information is to indicate that the first terminal device supports detecting the first wake-up signal; and
wherein to send the first wake-up signal to the first terminal device on the first resource the apparatus is further to:
send the first wake-up signal to the first terminal device on the first resource after determining, based on the fifth indication information, that the first terminal device supports detecting the first wake-up signal.

9. A communication method, wherein the method comprises:
receiving, by a second access device, seventh indication information from a first access device, and the seventh indication information comprises at least one type of the following information: a value of a parameter of a first terminal device, a first wake-up signal, an index value of the first wake-up signal, grouping information of terminal devices, and information about a wake-up signal corresponding to each terminal device group,
wherein the seventh indication information is used to determine the first wake-up signal, and the first wake-up signal is used to indicate the first terminal device in an inactive state to detect downlink control information that is carried in a first paging occasion resource and used to schedule a paging message;
sending, by the second access device, the first wake-up signal to the first terminal device on a first resource; and
sending, by the second access device on the first paging occasion resource, the downlink control information used to schedule the paging message, wherein
the second access device is an access device in a radio access network notification area (RNA) of the first terminal device.

10. The method according to claim 9, wherein the seventh indication information is carried in an Xn Application Protocol (XnAP) radio access network (RAN) paging message sent by the first access device to the second access device.

11. The method according to claim 9, wherein the seventh indication information is used to indicate a first terminal device group to which the first terminal device belongs, the first terminal device group is one terminal device group in one or more terminal device groups, each of the one or more terminal device groups corresponds to one wake-up signal, and the first wake-up signal is a wake-up signal corresponding to the first terminal device group.

12. The method according to claim 9, wherein the seventh indication information is used to indicate that the first terminal device supports detecting the first wake-up signal; and
the sending, by the second access device, the first wake-up signal to the first terminal device on a first resource comprises:
sending, by the second access device, the first wake-up signal to the first terminal device after determining, based on the seventh indication information, that the first terminal device supports detecting the first wake-up signal.

13. An apparatus, comprising:
one or more processors in communications with a memory configured to store program instructions that are executable by the one or more processors;
wherein the program instructions include instructions that, when executed, cause the apparatus to:
receive seventh indication information from a first access device, and the seventh indication information comprises at least one type of the following information: a value of a parameter of a first terminal device, a first wake-up signal, an index value of the first wake-up signal, grouping information of terminal devices, and information about a wake-up signal corresponding to each terminal device group,
wherein the seventh indication information is used to determine the first wake-up signal, and the first wake-up signal is used to indicate the first terminal device in an inactive state to detect downlink control information that is carried in a first paging occasion resource and used to schedule a paging message;
send the first wake-up signal to the first terminal device on a first resource; and
send on the first paging occasion resource, the downlink control information used to schedule the paging message, wherein
a second access device is an access device in a radio access network notification area (RNA) of the first terminal device.

14. The apparatus according to claim 13, wherein the seventh indication information is carried in an Xn Application Protocol (XnAP) radio access network (RAN) paging message sent by the first access device to the second access device.

15. The apparatus according to claim 13, wherein the seventh indication information is used to indicate a first terminal device group to which the first terminal device belongs, the first terminal device group is one terminal device group in one or more terminal device groups, each of the one or more terminal device groups corresponds to one wake-up signal, and the first wake-up signal is a wake-up signal corresponding to the first terminal device group.

* * * * *